(12) United States Patent
Cheng et al.

(10) Patent No.: US 11,867,018 B2
(45) Date of Patent: Jan. 9, 2024

(54) ANNULAR SEAL ASSEMBLY WITH AXIAL LOAD DECOUPLING FEATURE

(71) Applicant: Baker Hughes Oilfield Operations LLC, Houston, TX (US)

(72) Inventors: Samuel H. Cheng, Houston, TX (US); Greg Dunn, Houston, TX (US); Daryl Attaway, Houston, TX (US); Joseph Pallini, Tomball, TX (US); Amini Shakib, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/891,779

(22) Filed: Aug. 19, 2022

(65) Prior Publication Data

US 2022/0389782 A1 Dec. 8, 2022

Related U.S. Application Data

(62) Division of application No. 16/554,164, filed on Aug. 28, 2019, now Pat. No. 11,492,865.

(51) Int. Cl.
*E21B 33/04* (2006.01)
*F16J 15/02* (2006.01)

(52) U.S. Cl.
CPC ............. *E21B 33/04* (2013.01); *F16J 15/028* (2013.01)

(58) Field of Classification Search
CPC .................................. E21B 33/04; F16J 15/028
See application file for complete search history.

(56) References Cited

U.S. PATENT DOCUMENTS

| | | | |
|---|---|---|---|
| 4,488,740 A | 12/1984 | Baugh |
| 4,702,481 A | 10/1987 | Brammer |
| 4,815,770 A | 3/1989 | Hyne |
| 8,631,878 B2 | 1/2014 | Duong |
| 8,851,194 B2 | 10/2014 | Ford |
| 8,925,639 B2 | 1/2015 | Benson |
| 10,184,311 B2 | 1/2019 | Gadre |

(Continued)

OTHER PUBLICATIONS

"Drilling & Production Systems Surface Wellhead & Tree Technology Update," 2009, 33 pages.

(Continued)

*Primary Examiner* — Dany E Akakpo
(74) *Attorney, Agent, or Firm* — Hogan Lovells US LLP

(57) ABSTRACT

An annular seal system for sealing between a casing hanger and a wellhead housing, the system including an actuator ring having a rigid portion and a flexible portion, and a lockdown ring positioned adjacent the actuator ring. The annular seal system further includes a seal assembly capable of moving between a de-energized position and an energized position, wherein the seal assembly in the de-energized position has a defined a space between the seal assembly and the rigid portion of the actuator ring, wherein the seal assembly in the energized position has the space closed, wherein the rigid portion of the actuator ring is to contact a surface of the casing hanger, wherein the flexible portion of the actuator ring is to push the lockdown ring into engagement with the wellhead, and wherein the flexible portion of the actuator ring adapted is to axially compress to allow positional variation between the lockdown ring and the wellhead housing.

20 Claims, 17 Drawing Sheets

(56) References Cited

U.S. PATENT DOCUMENTS

| | | |
|---|---|---|
| 2013/0087977 A1 | 4/2013 | Galle |
| 2013/0140775 A1* | 6/2013 | Raynal .................... E21B 33/04 277/339 |
| 2014/0183824 A1 | 7/2014 | Benson |
| 2017/0114605 A1* | 4/2017 | Gadre .................... E21B 33/04 |

OTHER PUBLICATIONS

International Search Report and Written Opinion dated Nov. 6, 2020 in corresponding PCT Application No. PCT/US2020/048007.
Office Action dated Dec. 10, 2021 in corresponding U.S. Appl. No. 16/554,164.
Office Action dated Feb. 2, 2022 in corresponding U.S. Appl. No. 16/554,164.
Notice of Allowance dated Jul. 7, 2022 in corresponding U.S. Appl. No. 16/554,164.

* cited by examiner

ANNULAR SEAL ASSEMBLY WITH AXIAL LOAD DECOUPLING FEATURE

CROSS-REFERENCES TO RELATED APPLICATIONS

This application is a divisional application of allowed U.S. Non-Provisional application Ser. No. 16/554,164, filed Aug. 28, 2019, and is related to PCT Application Serial No. PCT/US20/48007, filed Aug. 26, 2020, both titled "ANNULAR SEAL ASSEMBLY WITH AXIAL LOAD DECOUPLING FEATURE," the full disclosures of both of which are hereby incorporated herein by reference in their entirety for all intents and purposes.

BACKGROUND

1. Field of Invention

This invention relates in general to equipment used in a wellhead annular seal assembly, and in particular, to a supporting structure that decouples a sealing system from axial loads intended for the sealing system.

2. Description of the Prior Art

Hangers, such as casing and/or tubing hangers, are used in offshore and onshore oil and gas rigs for various purposes. In an example, the casing hanger forms part of the wellhead and is lowered into the wellbore to an appropriate depth and rested on a shoulder or load ring inside the wellhead. The casing hanger may also be suspended in its position. The casing hanger may be provided for hanging the casing pipe. The casing hangers may be provided in a stack configuration. The casing may have subsequently smaller internal diameters (IDs) to isolate different zones within the wellbore. The annulus between each casing hanger and housing is sealed. Such a seal provides a pressure and temperature-resistant seal between the hanger and the wellhead. The seal, however, must hold pressure from different directions. Further, the suspension of the actuator ring or use of shoulders on the hanger may limit placement options and accuracy of placement of the seal.

SUMMARY

The present technology provides an annular seal system for sealing between a casing hanger and a wellhead housing, including an actuator ring comprising a rigid portion and a flexible portion, and a lockdown ring positioned adjacent to the actuator ring. The annular seal system further includes a seal assembly capable of moving from a de-energized position to an energized position, wherein when the seal assembly is in the de-energized position there is defined a space between the seal assembly and the rigid portion of the actuator ring, and when the seal assembly is in the energized position the space is closed, the rigid portion of the actuator ring contacts a surface of the casing hanger, and the flexible portion of the actuator ring pushes the lockdown ring into engagement with the wellhead, the flexible portion of the actuator ring adapted to axially compress to allow positional variation between the lockdown ring and the wellhead housing.

Another embodiment of the technology provides an annular seal and lockdown assembly between a hanger and a wellhead housing, including a seal assembly between the hanger and the wellhead housing, the seal assembly having an energized position, and a supporting structure comprising a rigid portion of an actuator ring, a flexible portion of an actuator ring, and a lockdown ring. The technology further includes a first load path directed, when the seal assembly is in the energized position, from the hanger through the rigid portion of the actuator ring to the seal assembly such that the position of the hanger relative to the seal assembly remains fixed, and a second load path from the wellhead housing through the lockdown ring and the flexible portion of the actuator ring to the seal assembly such that the relative position of the lockdown ring and the wellhead housing can vary as the seal assembly is energized.

Yet another embodiment of the technology provides a method for decoupling a seal assembly from reactive forces in a supporting structure, the supporting structure including an actuator ring having a rigid portion and a flexible portion, and a lockdown ring. The method includes the steps of enabling a first load path directed from a hanger through the rigid portion of the actuator ring to the seal assembly such that the position of the hanger relative to the seal assembly remains fixed, and enabling a second load path directed from a wellhead housing through the lockdown ring and the flexible portion of the actuator ring to the seal assembly such that the relative position of the lockdown ring and the wellhead housing can vary as the seal assembly is energized.

BRIEF DESCRIPTION OF THE DRAWINGS

Various embodiments in accordance with the present disclosure will be described with reference to the drawings, in which.

DETAILED DESCRIPTION

Figure 1:
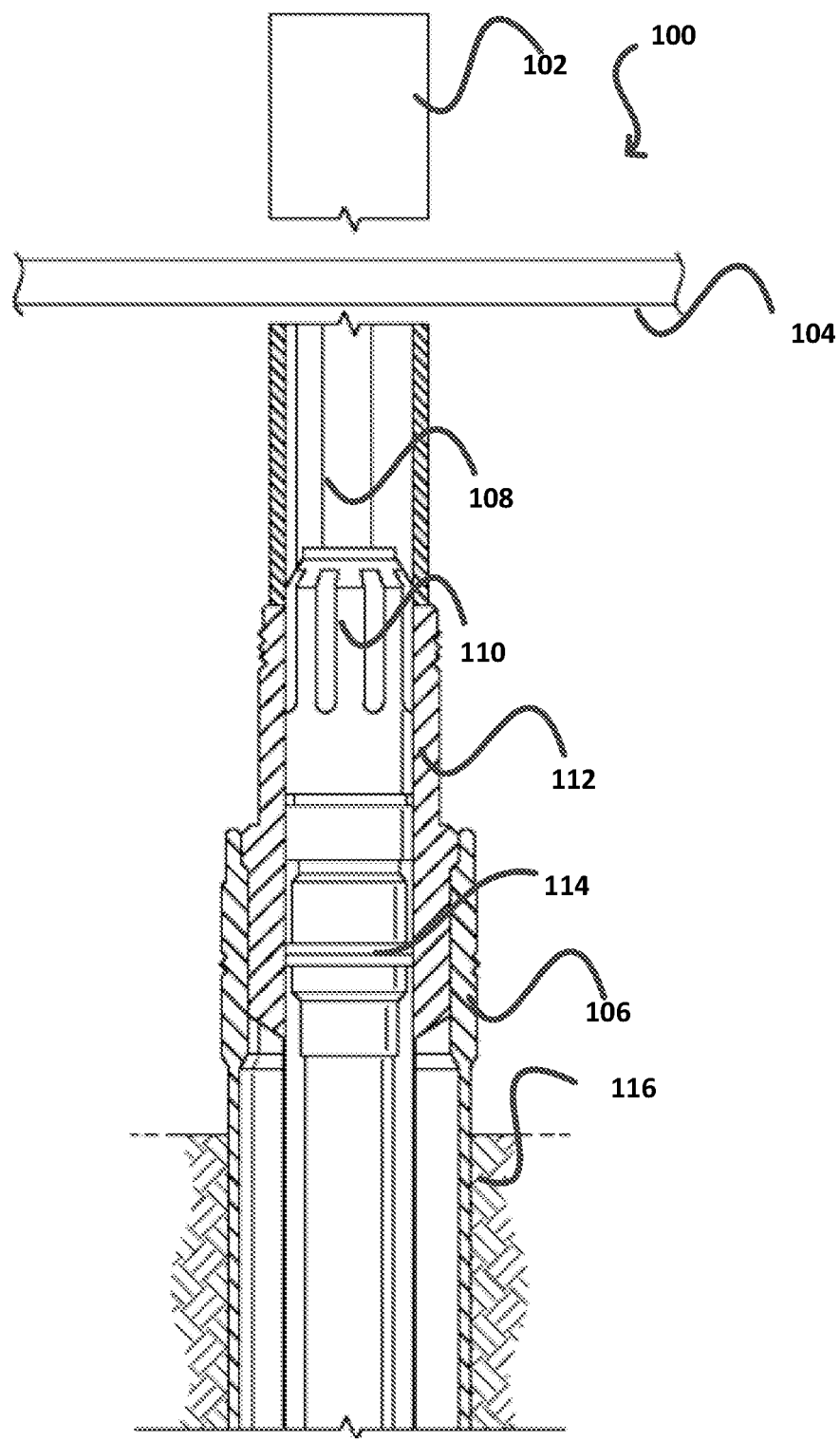
FIG. 1 illustrates an example of a wellbore with a casing hanger applied in a housing in which aspects of the present disclosure may be applied.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Typically, installation of a seal assembly between, for example, a casing hanger and a wellhead housing (or other similar well components) requires insertion of a U-shaped annular seal, a lockdown ring, and an actuator ring. The seal assembly is typically set and energized in one motion. To accomplish this, an energizing ring is inserted between legs of the U-shaped seal. As the energizing ring pushes downward, two primary actions occur. First, the annular seal pushes downward against the actuator ring, which in turn pushes the locking ring into engagement (usually via mating protrusions and grooves) with the wellhead housing. Second, the energizing ring pushes the legs of the U-shaped annular seal into sealing contact with the casing hanger and the wellhead housing.

In practice, when a casing hanger is inserted into a well adjacent a wellhead housing, it is difficult to line up the axial positions of the casing hanger and the wellhead housing exactly. This may be, for example, because debris in the wellbore impedes the relative positioning of the two components. As a result, when the seal assembly is installed, as discussed above, there can be variation between the position of the grooves in the wellhead housing and the corresponding protrusions on the lockdown ring. To compensate for this reality, in many known systems the protrusions on the lockdown ring are sized to allow play between the protrusions and the corresponding grooves in the wellhead housing. This simplifies installation by allowing some variance in the positions between the components, while still allowing them to engage. Problematically, however, this play may also lead to relative movement between the lockdown ring and the wellhead housing. This relative movement can become problematic when the system is under a pressure load because relative movement between the lockdown ring (and, by extension, the actuator ring and annular seal) and the wellhead housing can lead to degradation of the seal.

The technology described herein solves this problem by providing an actuator ring having both a rigid component and a flexible component. As the annular seal is set, a rigid load path is formed from the hanger, through the rigid component of the actuator ring to the annular seal. This rigid load path helps to ensure that the axial position between the annular seal and the casing hanger is locked. Simultaneously, a second load path is formed from the wellhead housing through the lockdown ring and the flexible portion of the actuator ring to the seal. The flexible portion of the actuator ring allows for some variability in the axial position of the lockdown ring relative to the wellhead housing, so that protrusions on the lockdown ring can line up closely with the corresponding recesses in the wellhead housing. Because of this variability in position, the protrusions on the lockdown ring can more closely correspond to the recesses in the wellhead housing, thereby reducing or eliminating play between the components. The reduction of play, in turn, helps to maintain the integrity of the annular seal.

The following description of the technology includes discussion of a number of different embodiments. In some embodiments, the rigid and flexible portions of the actuator ring can be separate components. For example, in FIGS. 2A-2D flexible and rigid components of the actuator ring are referred to as the flexible support member and the support sleeve, respectively. In other embodiments, the flexible and rigid portions of the actuator ring can be integral. The technology contemplates all of the different embodiments.

Further to the above, lockdown rings may feature tapered load shoulders. As a load is applied to the lockdown ring, a radial load is generated that reacts against the actuation ring that also has a tapered surface wedging against the lockdown ring. This radial load, in turn, generates an axial load that the sealing system has to hold. As the axial load of the hanger increases, so does the load that the sealing system has to hold. In some types of seals, a sealing system also has to hold pressure from below. This axial load can tend to hinder sealing performance of the sealing system by pushing the casing hanger, for example, upward relative to the sealing system. As such, this disclosure seeks to use the flexible support member to decouple the sealing system—i.e., either by absorbing at least part of or by limited transfer of— axial loads from reactive forces generated by the actuator ring and the lockdown ring being engaged and locked together. Reactive forces, including wedge reactive forces are intended forces for the sealing system, but are limited from reaching the sealing system because of the disruption of the flexible support member by one or more of compressing, collapsing, rupturing, and flexing of the flexible support member. In some instances, the wedge reactive forces can occur because of a tapered interface in the supporting structure after it is mechanically locked.

In certain embodiments, spacing can be provided between the supporting structure and the sealing system until after loading commences for the sealing system. Accordingly, the sealing system has a de-energized position and an energized position, and is capable of movement between the positions with the supporting system being in a locked position. For example, an energizing ring and a U-cup (or U-shaped seal) may, together or independently, move when the energizing ring (E-ring) is energizing the U-cup. The supporting structure includes an actuator ring that may be spaced from a support sleeve or other rigid shoulders of the supporting structure to prevent disruption of the flexible support member when the sealing system is in the de-energized position. In particular, the spacing ensures that the flexible support member is not disrupted until the sealing system rests on the supporting structure. As such, the spacing allows a U-cup of the sealing system to descend on to the supporting structure and allows an E-ring to energize the sealing system while it rests on the supporting structure. In an example, loading of the sealing system until the sealing system rests on the supporting structure can be performed as part of an energizing action performed for energizing the sealing system. In such instances, energizing commences after locking of the supporting structure, with the loading of the sealing system, the closing of the spacing, the disruption of the flexible support member, the resting of the sealing system on the supporting structure, and the energizing of the U-cup. As such, loading and energizing of the sealing system may be used interchangeably. A person of ordinary skill would readily understand how and when loading and/or energizing is applied and if applied separately or part of a single step, upon reading the present disclosure.

Some aspects of the present disclosure are directed to an annular seal assembly, including a metal-to-metal sealing system, with a supporting structuring, a flexible support member, and spacing that closes to support or enable energizing of the sealing system. These features address deficiencies noted above in prior systems. A rigid loading path may include shoulders of the supporting structure. At least two shoulders may be provided on two or more components in a locked position. The locked position may be provided by a mechanical locking between the two or more components. The two or more components can include a hanger, a support sleeve, an actuator ring, and a lockdown ring. The actuator ring can include a tapered portion for engaging a lockdown ring during a locking stage, and includes, integrally or separately, the flexible support member for disrupting, e.g., by collapsing or compressing, during loading of the sealing system above the actuator ring. In an example, the flexible support member forms a compliant loading path and may be a flexible support member, a combination of a collet and bump, a bladder, or one or more collapsible or compressible members forming at least part of the flexible support member. In an example, the rigid loading path and the compliant loading path can be formed as described, that is, by at least the arrangement of components, but may also functionally provide rigidity and compliance, respectively, after the supporting structure is mechanically locked in position and after the sealing system is loaded and/or energized. As such, a person of ordinary skill reading the present disclosure will recognize that the arrangement of components provides the path referenced above and that the path functionally provides the decoupling feature by certain aspects including at least the flexible support member and spacing provided prior to loading of the sealing system.

The flexible support member maybe an integral part of the actuator ring (e.g., both can be manufactured to form a single structure) while the bladder may be separate from the actuator ring, but still requiring the actuator ring for functionality, as described herein. As such, the bladder can be included with the actuator ring or comprised in the actuator ring. The tapered portion engages with at least one portion of the lockdown ring to provide the supporting structure when the actuator ring is locked with the lockdown ring. In some aspects, the supporting structure is at an intended or predetermined position between a wellhead housing and a hanger. The flexible support member, when disrupted, limits any net axial force from being transferred back into the sealing system. For example, with loads from below the intended position or wedge reactive forces can form from a tapered interface in between the supporting structure. In aspects disclosed herein, the lockdown ring is locked in position and has at least one of the two shoulders provided in the supporting structure for the sealing system. In an example, a hanger provides another shoulder for the sealing system. In a further example, a support sleeve tags on the hanger body and a first shoulder on the support sleeve and two second shoulders on the actuator ring form the at least two shoulders of the supporting structure.

The flexible support member may be predetermined to collapse or compress to a degree to enable the sealing system to be loaded and energized. A further allowance may exist in the flexible support member after its collapse or after it compresses to absorb further axial loads below the intended position in the spacing. The sealing system is loaded and energized above the supporting structure which causes the above-referenced spacing to close and causes the flexible support member to collapse or compress, which decouples the sealing system from axial loads associated with the above-referenced wedge reactive forces. For example, at least a predetermined parameter associated with the flexible support member or the supporting structure may be required to be provided at an intended position to support the sealing system. Such a predetermined parameter may include a predetermined setting load to be achieved during locking stage of the supporting structure, for one or more periods of time, where the supporting structure is in its intended position without collapsing or compressing the flexible support member. In some embodiments, other predetermined parameters may be a predetermined wedge reaction force for the supporting structure to be achieved for one or more periods of time without collapsing or compressing the flexible support member during locking of the supporting structure. In other embodiments, parameters can include a predetermined amount of movement that is influenced between the actuator ring and the lockdown ring prior to the locking stage and without collapsing or compressing the flexible support member during the locking stage.

The flexible support member may separately include a predetermined degree of collapse or compression to be achieved, as part of the predetermined parameters, during loading of the sealing system so that an allowance to collapse and compress further may be available to further absorb axial loads from below the spacing at the intended position, thereby contributing to the above-referenced wedge reactive forces. Furthermore, to achieve locking, loading, and energizing by a single continuous act, a predetermined load may be transferred into the supporting structure to cause the engagement for the locking stage. When the predetermined load is exceeded, however, the loading and energizing stages can occur with the flexible support member collapsing or compressing. When load is applied from below the supporting structure, the flexible support member may have an allowance even after it is collapsed or compressed to absorb axial loads, thereby limiting any further axial load from being transferred into the overlying sealing system.

The aforementioned axial loads can be dissipated by virtue of the strength (e.g., stiffness) of the supporting structure being locked in the intended position and the flexible support member disrupting in the manners discussed throughout this disclosure. In aspects of this disclosure, the intended position is interchangeably used to describe positions of one or more of: the supporting structure or its components (e.g., without limitation, the actuator ring and the lockdown ring), when mechanically locked. As such, once locked in place, the supporting structure and its components can form an intended position, and the sealing system can be energized at the intended position of the supporting structure.

Various other functions can be implemented within the various embodiments as well as discussed and suggested elsewhere herein.

FIG. 1 illustrates a drilling system 100 including a wellbore with a casing hanger in which aspects of the present disclosure may be applied. However, the present disclosure is not limited to example 100, as a person of ordinary skill reading the present disclosure will recognize, as the present decoupling may be applied to other sealing systems requiring decoupling of axial forces and requiring a stable supporting structure. In the system 100, region 116 may represent subsea or, offshore or onshore environment with the wellbore penetrating the environment for oil and gas extraction. A low pressure wellbore housing 106 may include a wellhead 112, and a tubing or casing hanger 114, which may be moved into place with a running tool 110. An external wellhead supporting structure of the low pressure wellbore housing 106 (e.g., conductor casing) supports the wellhead 112 and additional casings within the wellhead. Strings of drill pipe are provided to approach the required depth for placement and drilling. For example, running string or landing string 108 may be used to place the hanger 114 in its position in the wellhead 112. In addition, a platform 104 may be available in example 100, where equipment in module 102 is provided for power, communication, and monitoring between the wellhead 112 and external structures. In an alternate implementation, where a tubing hanger may be included, a similar seal structure can be included.

A person of ordinary skill reading the present disclosure would recognize that equipment in system 100 may include a power unit for providing power through the drill string into the wellbore, as well as for controlling the drilling into the wellbore. A power unit may be located near the drill string, at about the center of the platform 104. In addition, the system 100 may include a communications outpost, such as a subsea electronics module (SEM), for providing communications to other units. In addition, in subsea implementations, the platform 104 can be at the surface of the sea, while the wellhead 112 and the SEM can be located at subsea levels. The power unit may be coupled with the communications to allow for redundancy and singular cable transmission through the wellhead, while providing sufficient room for drilling via rotation of the drill string 108. FIG. 1 also illustrates that the aforementioned hangers may benefit from accurate placement of a sealing system (described below) via the present supporting structure with its axial load decoupling features.

Figure 2A:
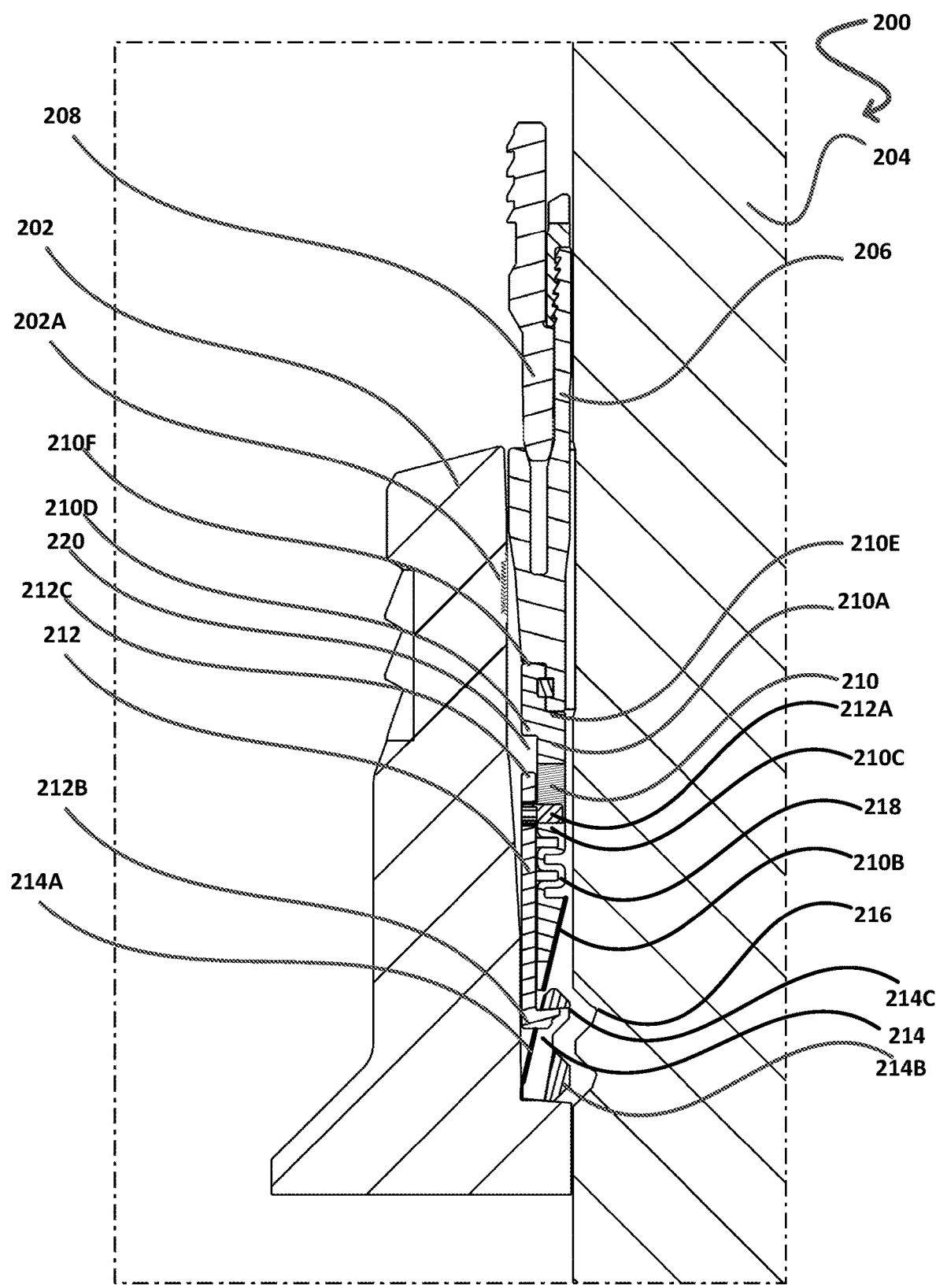
FIGS. 2A-2C illustrate an example system, in various stages, having a supporting structure, a sealing system, and a flexible support member, in accordance with an aspect of this disclosure.
Figure 2B:
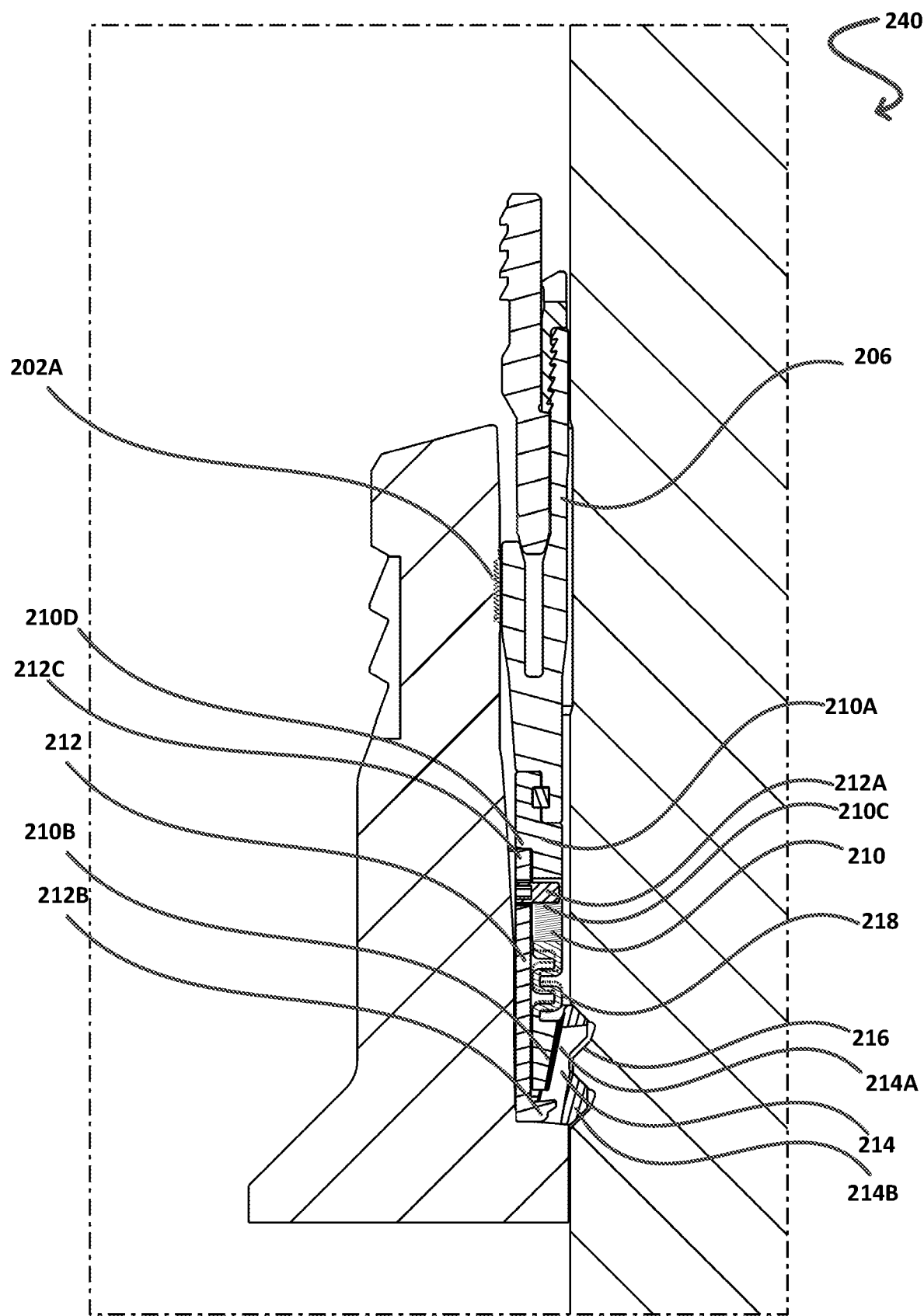
Figure 2C:
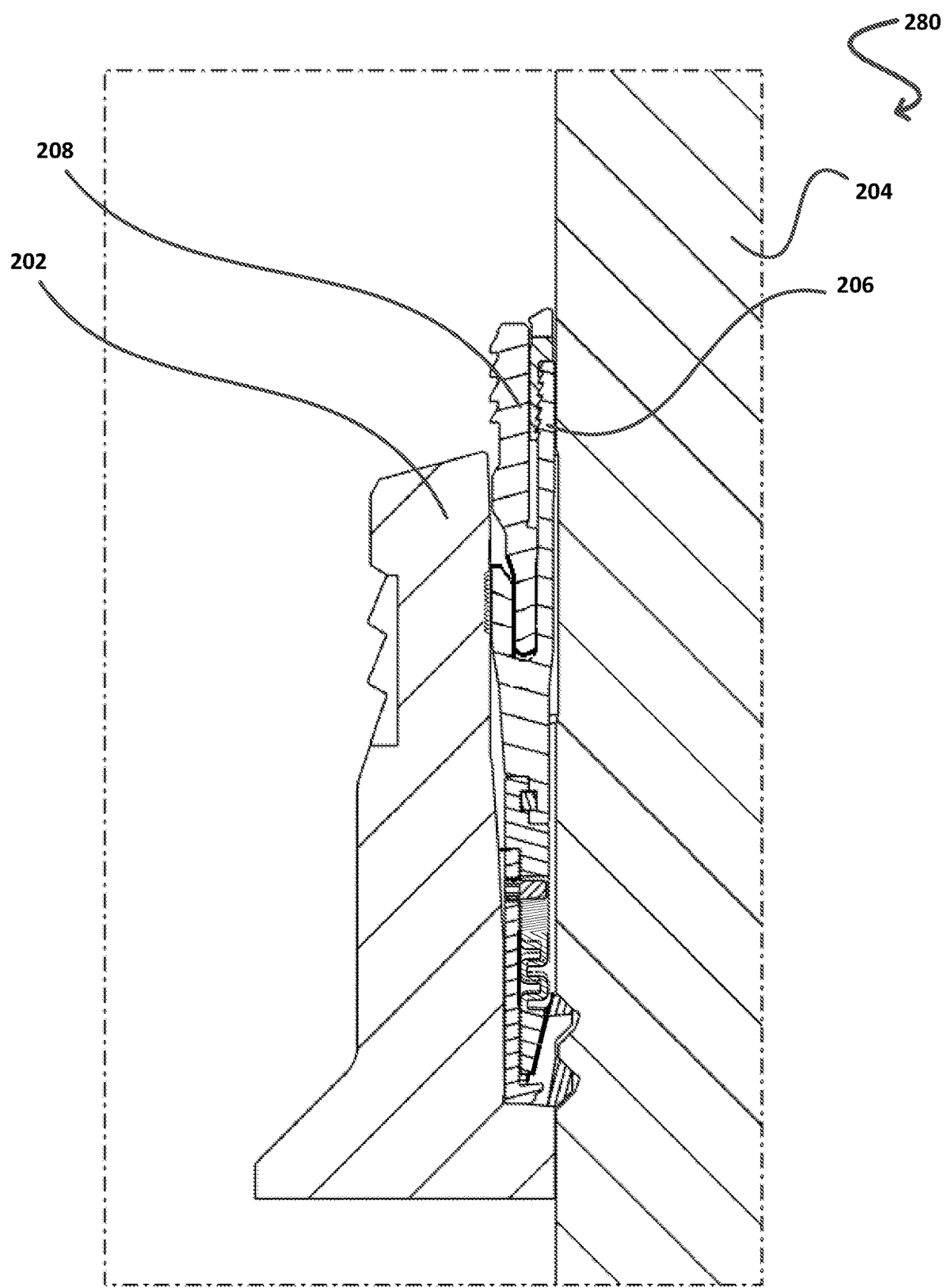

FIGS. 2A-2C illustrate an example system, in various stages 200, 240, 280, having a supporting structure 210, 214, a sealing system or seal assembly 206, 208, and a flexible support member 218, in accordance with an aspect of this disclosure. The example system represents stages of a single system, but may be described separately. In the example system here and in the other examples disclosed herein, annular seal assemblies are provided with a respective supporting system and sealing system. As shown in the figures, at least a portion of a flexible support member 218 can be composed of S-shaped curves or other non-linear portions. A person of ordinary skill reading the present disclosure will recognize that such non-linear portions can have variable stiffness and are subject to compression, or collapsing, as a force is applied. In some embodiments, the flexible support member can be a non-linear spring, a softening spring, or a buckling spring. FIG. 2A illustrates a landing stage 200 of the example system, where components of the supporting structure (as well as, in some embodiments, components of the sealing system) are generally associated together or loosely engaged together, and are lowered/landed into the area between the hanger 202 and the wellhead housing 204, as described herein. For example, the components of the supporting structure may include the actuator ring 210, the lockdown ring 214, and a support sleeve 212. In some examples, the support sleeve 212 may not be required. In further examples, a hanger 202 may form part of the supporting structure. The actuator ring 210 can include a tapered portion 210B for engaging the lockdown ring 214 and, integrally and/or separately, includes the compliant coupling, or, in this example, flexible support member 218, for collapsing or compressing during a loading and/or an energizing stage for the sealing system 206, 208. The flexible support member 218 is illustrated as an integral part of the actuator ring. In some aspect, the flexible support member 218 may be separate from the actuator ring 210, but the actuator ring may be required to intimately support the flexible support member 218 to prevent dislodging during the locking process.

In an application, the actuator ring 210 is loosely engaged with the flexible support member 218 and with at least one portion, illustrated as an angled ledge 214C, of the lockdown ring 214 to enable landing of the supporting structure in an area provided between the hanger 202 and the wellhead housing 204. Wickers 202A may be provided, integral to or separate from, the hanger 202 to engage the U-cup 206. Further, one or more components of the sealing system or a seal assembly, including U-cup 206 and E-ring 208 may also be loosely engaged and landed with or subsequent to the supporting structure. A support sleeve 212 may be provided as part of the supporting structure in an engagement with the actuator ring 210. The support sleeve 212 is also enabled to tag the hanger surface during a locking stage for the supporting structure. The support sleeve 212 has a first lifting shoulder or attachment pin 212A for carrying weight of the support sleeve during installation and removal of the support sleeve, a second lifting shoulder 212B for the angled ledge or notch 214C of the lockdown ring 214, and a support shoulder 212C on top of the support sleeve 212 (to mate shoulder 210D of the actuator ring 210 for correctly positioning the sealing system after the locking stage). The lifting shoulders are for assisting with removal or installation of components of the supporting system by supporting the weight of one component on the other, while the support shoulder forms part of a rigid load path. Attachment pin 212A in this and other embodiments may be an independent attachment to the support sleeve. The combination of the actuator ring 210, the support sleeve 212 with its first shoulder or attachment pin 212A in slot or notch 210C and with its second shoulder 212B in the angled ledge 214C of the lockdown ring 214, and the lockdown ring 214 may be lowered together into the area between hanger 202 and wellhead housing 204. Intermediate structures, such as a slick bore/housing, are omitted from the figures for clarity, but may be included in application.

Once landed in the area, a load may be applied to the actuator ring 210. For example, U-cup 206 and E-ring 208 may be included in the area as loosely engaged with a rigid portion 210A of the actuator ring 210. The rigid portion 210A of the actuator ring 210 includes two shoulders 210E, 210F for receiving the U-cup 206, as illustrated. The load to the actuator ring 210 may be via the U-cup 206. The load to the actuator ring 210 transfers to the flexible support member 218 to enable a tapered portion 210B of the actuator ring 210 to engage at least one portion 214A of a lockdown ring 214 until the actuator ring 210 is locked in an intended position within the area. The flexible support member 218 has sufficient rigidity (e.g., non-compliance, non-compressibility, or non-flexibility) so that it does not collapse or fully compress during the locking stage. In addition, a space 220 exists, as illustrated by the features of the supporting structure and the sealing system. The space is illustrated in this example as between the support shoulder 212C of the support sleeve 212 and the shoulder 210D of the actuator ring. The space 220 is maintained during the landing stage and after the locking stage of the supporting structure, until loading commences to energize the sealing system. The sealing system is moved from a de-energized position to an energized position and the spacing closes during the process as the sealing system, by virtue of the U-cup 206, for instance, rests on the supporting structure. The space 220 ensures that the flexible support member 218 is not disrupted until the loading or energizing stages for the sealing system commence. As such, closing the space 220 allows the U-cup 206 of the sealing system to descend and rest on the supporting structure. Once space or spacing 220 is closed, loading on the E-ring 208 energizes the sealing system while it rests on the supporting structure.

FIG. 2B illustrates the example system 240 just after the locking stage, in accordance with an aspect of this disclosure. FIG. 2B also illustrates that the energizing stage for the sealing system has started causing the flexible support member 218 to compress and collapse. This is illustrated by the solid lines of the flexible support member 218 representing the compressed or collapsed state versus the dotted lines for the same member representing its initial uncompressed or not-collapsed state. In addition, FIG. 2B illustrates that space 220, previously provided for the supporting structure (in FIG. 2A), has closed as the locking stage has been completed and the loading and/or energizing stages have begun. As such, now that the space 220 has closed, the U-cup 206 of the sealing system is resting on surfaces formed from support shoulders in the supporting structure. Load on the E-ring 208 may be continually applied after the sealing system is resting on the support shoulders to energize the sealing system (e.g., energize the U-cup 206). The flexible support member 218 in this and the embodiments throughout this disclosure has a trigger point or condition where it ceases spring-like tendencies and commences acting as a softening spring. The characteristic of a negative spring rate (e.g., softening spring) or complete loss of load-carrying ability fully eliminates load transfer through the compliant load path. For example, the tapered interface between the actuator ring 210 and the lockdown ring 214 results in wedge reactive forces from axial loads on the supporting structure. The wedge reactive forces are decoupled from the sealing system because of the complete loss of load-carrying ability of the flexible support member 218. In the system of FIGS. 2A-2C, the trigger point or condition for the flexible support member 218 occurs when it plastically collapses and buckles to close the spacing. The flexible support member 218 acts like a regular spring with a linear spring rate until it yields, and after that point, it folds over with little to no resistance. The sealing system rests on the supporting structure with axial loads being decoupled from the sealing system.

In FIG. 2B, components previously referred to from FIG. 2A are also illustrated and have the same function and identifiers as in FIG. 2A. As such, omitted numeral references may be carried over from FIG. 2A to FIG. 2B. In FIG. 2B, the U-cup 206 is illustrated in a lower position that may be caused by a load on the U-cup 206 from above. The load transferred to or directly applied to the actuator ring 210 causes the actuator ring 210 to engage and to subsequently lock tapered portion 210B with corresponding tapered portion 214A of the lockdown ring 214 to form a tapered interface. Flexible support member 218 may be a rigid flexible support member, a curved flexible support member, a square flexible support member, an axial flexible support member, or a dual bias flexible support member. This enables various customizable loads and intended positions (to be achieved by the present system 200, 240, 280). That is, it is possible to determine an intended position of the sealing system, at least as to the U-cup 206 relative to the hanger and/or the wellhead housing, and to stop the application of a force creating the load on the flexible support member 218 when the intended position of the actuator ring is reached.

In an example application, the support sleeve 212 can be forced down with the actuator ring 210, and can also tag the hanger to provide rigid support for the actuator ring 210 and the lockdown ring 214. The actuator ring 210, therefore, has a first portion 210B that is a tapered portion for engaging a corresponding tapered portion 214A of the lockdown ring 214. As the actuator ring 210 is loaded down it engages the lockdown ring 214. Once the actuator ring 210 is locked with the lockdown ring 214, the loading and/or energizing stage may begin. In an aspect, the loading and/or energizing stage for the sealing system can overlap an end of the locking stage for the supporting structure. FIG. 2B also illustrates, just after locking, that protrusions 214B of the lockdown ring 214 may engage indentations 216 of the wellhead housing, or any intermediate structure therebetween. This furthers rigidity present in the supporting structure by locking the lockdown ring 214 in place with the actuator ring 210, the support sleeve 212, and the hanger 202.

FIG. 2C illustrates the energized sealing system 206, 208, and the supporting structure provided by the hanger 202, the lockdown ring 214, actuator ring 210, and support sleeve 212, all locked together in the intended position. The flexible support member 218, as illustrated in the locked position of the actuator ring 210 and the lockdown ring 214, has additional allowance for further collapsing or further decompressing during and after the energizing stage. This further collapsing or further decompressing enables decoupling of additional axial loads resulting from forces on the actuator ring 210 in the intended position (locked). The additional axial load may be related to the energizing of the sealing system, i.e., may be asserted from below the sealing system after it has been energized. The additional axial loads cause additional wedge reactive forces in the tapered interface of the supporting structure. In an example, the sealing system is energized by driving the E-ring 208 into the cup of the U-cup 206. Furthermore, the U-cup 206 may include a tapered mouth to resist the E-ring 208 initially, which prevents incidental energizing of the sealing system. The loading of the supporting structure 210, 212, 214, and the energizing of the sealing system 206, 208 may be enabled by a single continuous load applied beginning at the U-cup 206 and then the E-ring 208, or at the E-ring 208 exclusively. The supporting structure 210, 212, 214, and the sealing system 206, 208 may, therefore, be set in one continuous action. The rigid loading path in the system of FIGS. 2A-2C includes at least the support shoulder 212C of the support sleeve 212 that receives resting shoulder 210D of the actuator ring and the support shoulder 210E of the actuator ring 210 for receiving the U-cup 206. The compliant loading path in the system of FIGS. 2A-2C includes at least the flexible support member 218.

Figure 3A:
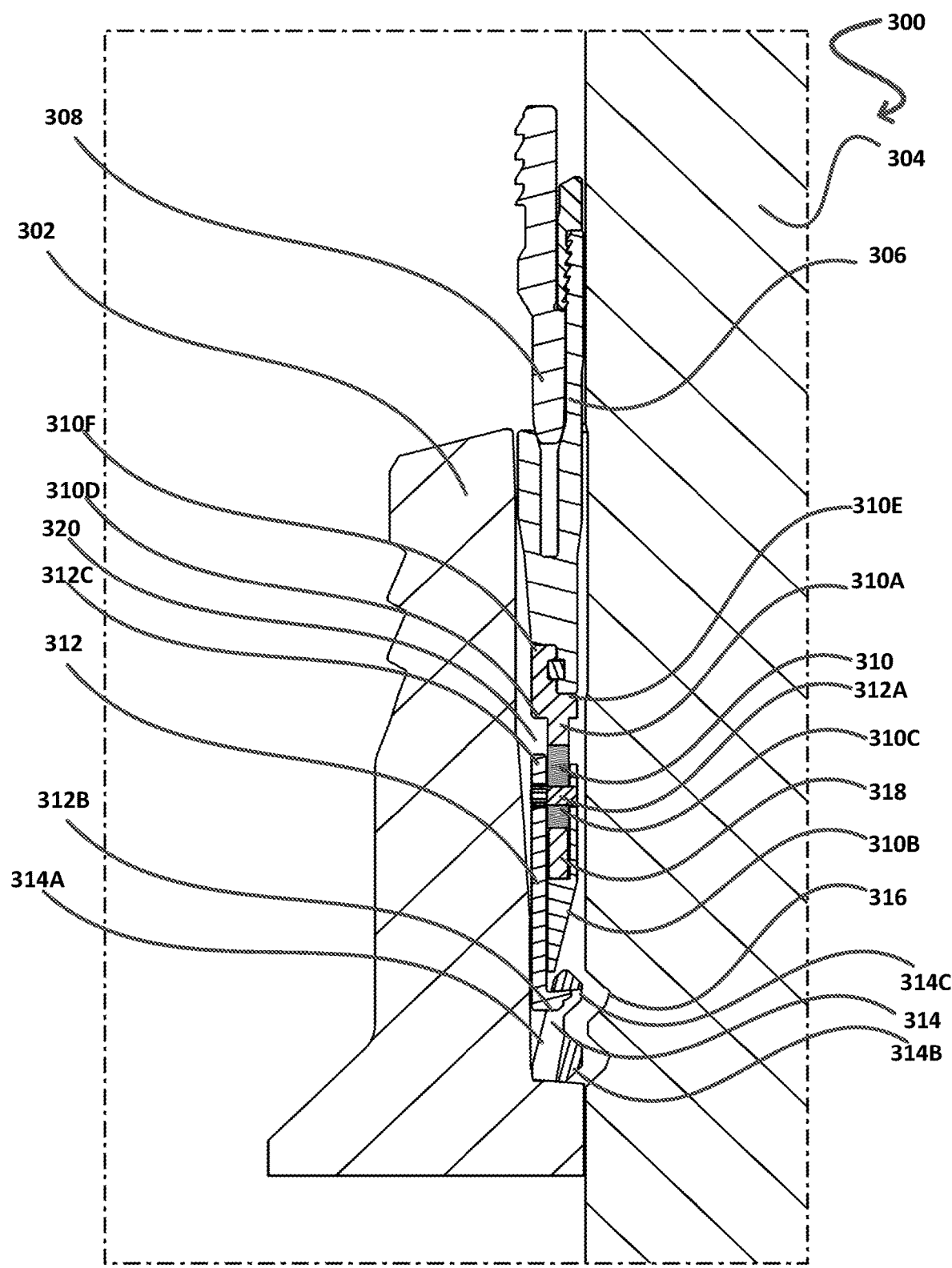
FIGS. 3A-3C illustrate yet another example system, in various stages, having a supporting structure, a sealing system, and a bladder-type flexible support member, in accordance with an aspect of this disclosure.
Figure 3B:
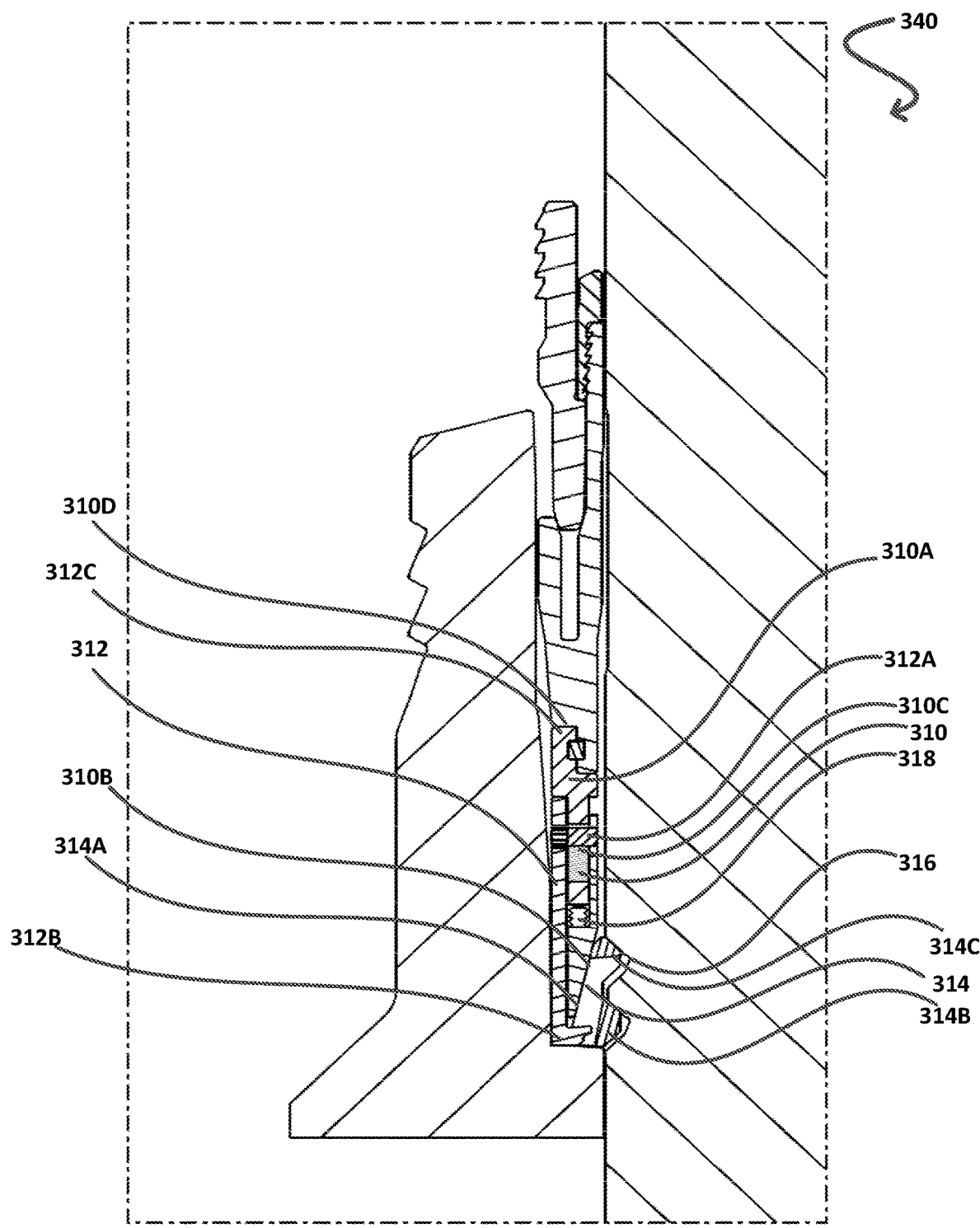
Figure 3C:
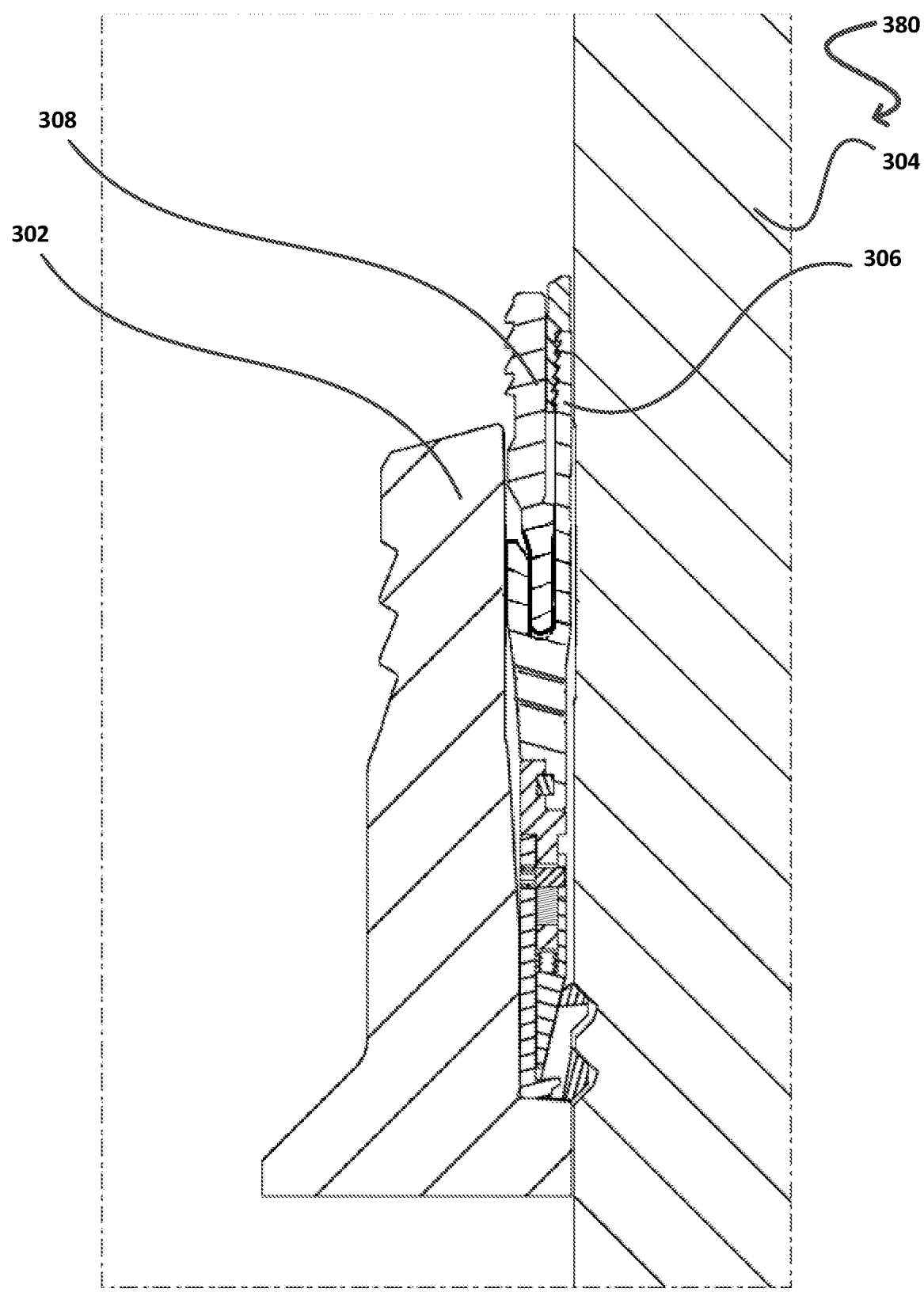

FIGS. 3A-3C illustrate an example system, in various stages 300, 340, 380, having a supporting structure 310, 314, a sealing system 306, 308, and a bladder-type flexible support member 318, in accordance with an aspect of this disclosure. FIG. 3A illustrates a landing stage 300 of the system, where components of the supporting structure (and may include components of the sealing system) are generally associated or loosely engaged together, and are lowered/landed into the area between the hanger 302 and the wellhead housing 304, as described herein. For example, the components of the supporting structure may include the actuator ring 310, the lockdown ring 314, and a support sleeve 312. In some examples, the support sleeve 312 may not be required. The actuator ring 310 includes a tapered portion 310B for engaging the lockdown ring 314 and integrally and/or separately includes the flexible support member 318 that can disrupt, by rupturing, during subsequent loading and/or energizing of the sealing system. The flexible support member 318 is illustrated as a separate part of the actuator ring (e.g., manufactured separately from the actuator ring 310) while embodiments may combine the flexible support member 318 with the actuator ring 310 so that the actuator ring 310 intimately supports the flexible support member 318 to prevent dislodging during the locking process. The flexible support member 318 may or may not include fluid based in part on the predetermined parameters intended for the sealing system, including for positioning of the supporting structure.

In application, the actuator ring 310 is engaged with the flexible support member 318 and with at least one portion 314C, illustrated as an angled ledge, of the lockdown ring 314 to enable landing of the supporting structure for the sealing system in this example, as in the case of FIGS. 2A-2C. Furthermore, aspects of the example of FIGS. 2A-2C may be incorporated into the example of FIGS. 3A-3C, as will be readily understood by a person of ordinary skill reading the present disclosure. A support sleeve 312 may be provided as part of the supporting structure with a first lifting shoulder or attachment pin 312A for carrying weight of the support sleeve during installation and removal. The support sleeve 312 has a second lifting shoulder 312B for the angled ledge 314C of the lockdown ring 314 and a support shoulder 312C on top of the support sleeve 312 (to mate shoulder 310D of the actuator ring 310 for correctly positioning the sealing system after the locking stage 340). The combination of the actuator ring 310, the support sleeve 312 with its first shoulder or attachment pin 312A in notch 310C and with its second shoulder 312B in the angled ledge 314C of the lockdown ring 314, and the lockdown ring 314 may be lowered together into the area between hanger 302 and wellhead housing 304. Intermediate structures, such as a slick bore, are omitted from the figures for clarity, but may be included in application.

Once landed in the area, a load, as will be readily understood to a person of ordinary skill reading the present disclosure, may be applied to the actuator ring 310. For example, U-cup 306 and E-ring 308 may be included in the area in a loosely engaged manner. Rigid portion 310A of the actuator ring 310 includes two shoulders 310E, 310F for receiving the U-cup 306, as illustrated. The load to the actuator ring 310 may be via the U-cup 306, for instance. The load to the actuator ring 310 enables the tapered portion 310B of the actuator ring 310 to engage at least one portion 314A of the lockdown ring 314 until the actuator ring 310 is locked in an intended position within the area. This is illustrated in subsequent figures—e.g., FIGS. 3B, 3C. In addition, a space 320 exists as illustrated by the features of the supporting structure and the sealing system. The space 320 is illustrated in this example as between the support shoulder 312C of the support sleeve 312 and the shoulder 310D of the actuator ring. The space 320 is maintained during the landing stage 300 and after the locking stage 340, and is maintained until loading commences for the sealing system to energize the sealing system. The space 320 ensures that the flexible support member 318 is not disrupted until the loading or energizing stages for the sealing system commences. As such, the space 320 allows the U-cup 306 of the sealing system to descend on to the supporting structure and rest on to the supporting structure. Once the space 320 is closed, loading on the E-ring 308 energizes the sealing system while it rests on the supporting structure.

FIG. 3B illustrates an example system 340, just after the locking stage, in accordance with an aspect of this disclosure. FIG. 3B also illustrates that the energizing stage for the sealing system has started causing the flexible support member 318 (i.e. the bladder) to rupture, as illustrated. In addition, FIG. 2B illustrates that space 320 previously provided for the supporting structure (in FIG. 3A) has closed as the locking stage has been completed and the loading and/or energizing stages have begun. As such, now that the space 320 has closed, the U-cup 306 of the sealing system is resting on surfaces formed from support shoulders in the supporting structure. The E-ring 308 continues to energize the sealing system while the sealing system rests on the supporting structure. In the system of FIGS. 3A-3C, a trigger point or condition for the flexible support member 318 occurs when the bladder mechanically ruptures to close the spacing 320. The flexible support member 318 acts like a regular spring with linear spring rate until it ruptures, and after that point, it deflates and offers no resistance. The sealing system then rests on the supporting structure with axial loads being decoupled from the sealing system.

In FIG. 3B, components previously referred to from FIG. 3A are also illustrated and have the same function and identifiers as in FIG. 3A. As such, omitted numeral references may be carried over from FIG. 3A to FIG. 3B. In FIG. 3B, the U-cup 308 is illustrated in a lower position that may be caused by a load on the U-cup 308 from above. The load transferred to or directly applied to the actuator ring 310 may cause the tapered portion 310B of the actuator ring 310 to engage a corresponding tapered portion 314A of the lockdown ring 314 to form the tapered interface. Flexible support member 318 may include or not include a fluid to partly resist a load asserted during energizing of the sealing system, until it begins to rupture.

In an example, the support sleeve 312 is forced down with the actuator ring 310 and also tags the hanger providing rigid support for the actuator ring 310 and the lockdown ring 314. The actuator ring 310, therefore, has a first portion 310B that is a tapered portion for engaging a corresponding tapered portion 314A of the lockdown ring 314. Subsequently, loading of the sealing system above the supporting structure causes the flexible support member 318 to rupture to a degree until the sealing system is fully energized, but a further allowance to rupture may be available so that load from below the wellhead, for example, may be absorbed and not transferred to the sealing system. The flexible support member 318 is at a point where its stiffness plateaus or reduces, thus limiting any further loading from being transferred into the seal. FIG. 3B also illustrates, just after the locking stage, that protrusions 314B of the lockdown ring 314 may engage indentations 316 of the wellhead housing or any intermediate structure there between. This furthers rigidity in the supporting structure and locks the lockdown ring 314 in place with the actuator ring 310 and the support sleeve 312.

FIG. 3C illustrates the energized sealing system 306, 308, above the supporting structure 310, 312, 314 provided by the locked configuration of the lockdown ring 314, the actuator ring 310, and the support sleeve 312. The supporting structure, as illustrated, in its locked position, decouples axial loads resulting from reactive wedge forces on the actuator ring 310 through at least the tapered interface between the tapered portions of the actuator ring and the lockdown ring 314. The U-cup 306 may include a tapered mouth to resist the E-ring 308 initially, which prevents incidental energizing of the sealing system. The locking of the supporting structure 310, 312, 314 and the loading and/or energizing of the sealing system 306, 308 may be enabled by a single continuous force from a load applied, beginning at the U-cup 306 and then the E-ring 308. The supporting structure 310, 312, 314 and the sealing system 306, 308 may, therefore, be set in one continuous action. The rigid loading path in the system of FIGS. 3A-3C comprises at least the support shoulder 312C of the support sleeve 312 that receives resting shoulder 310D of the actuator ring 310, and the support shoulder 310E of the actuator ring 310 that receives the U-cup 306. The compliant loading path in the system of FIGS. 3A-3C comprises at least the flexible support member 318.

Figure 4A:
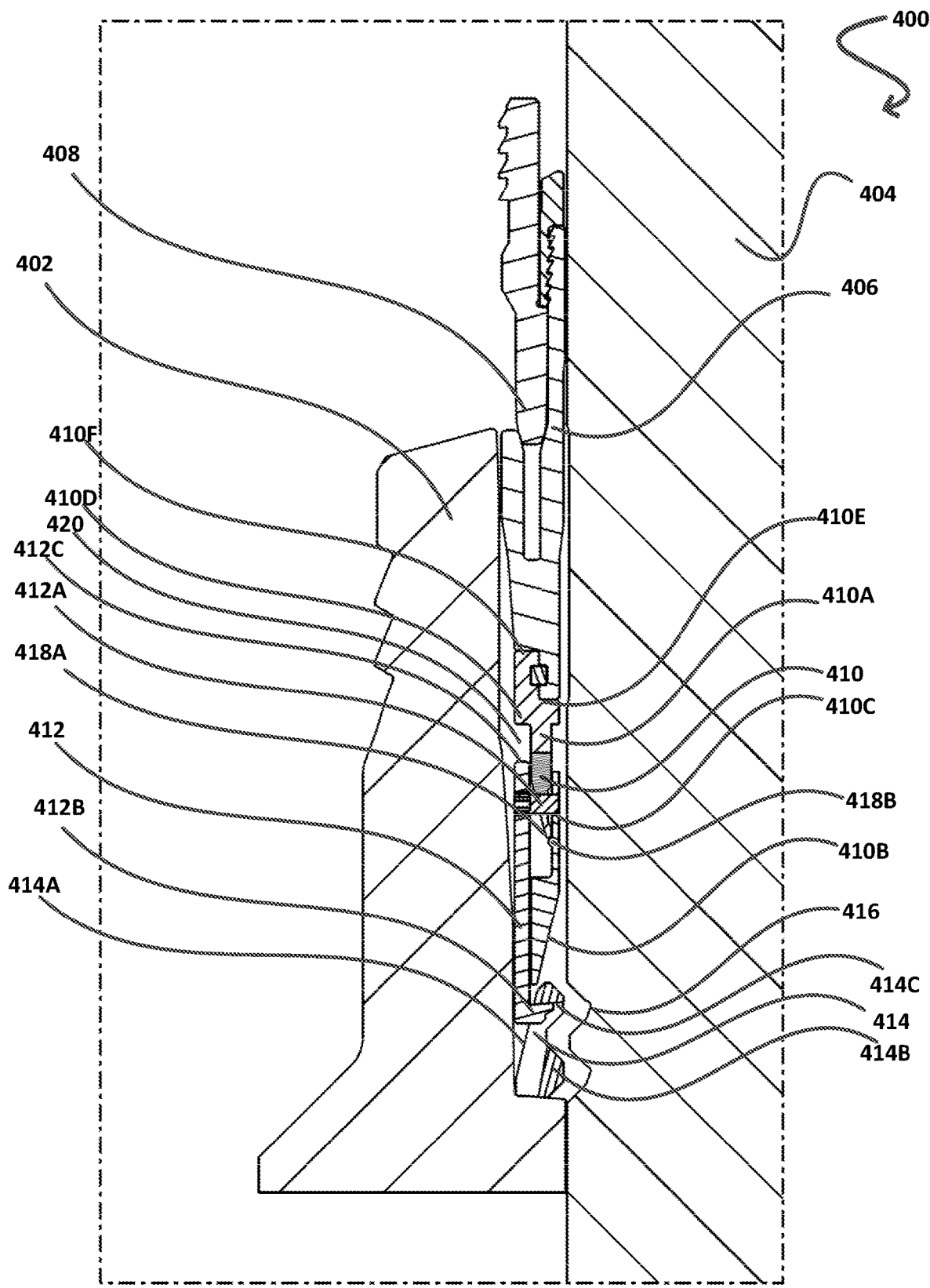
FIGS. 4A-4C illustrate yet another example system, in various stages, having a supporting structure, a sealing system, and a collet and bump arrangement forming a flexible support member, in accordance with an aspect of this disclosure.
Figure 4B:
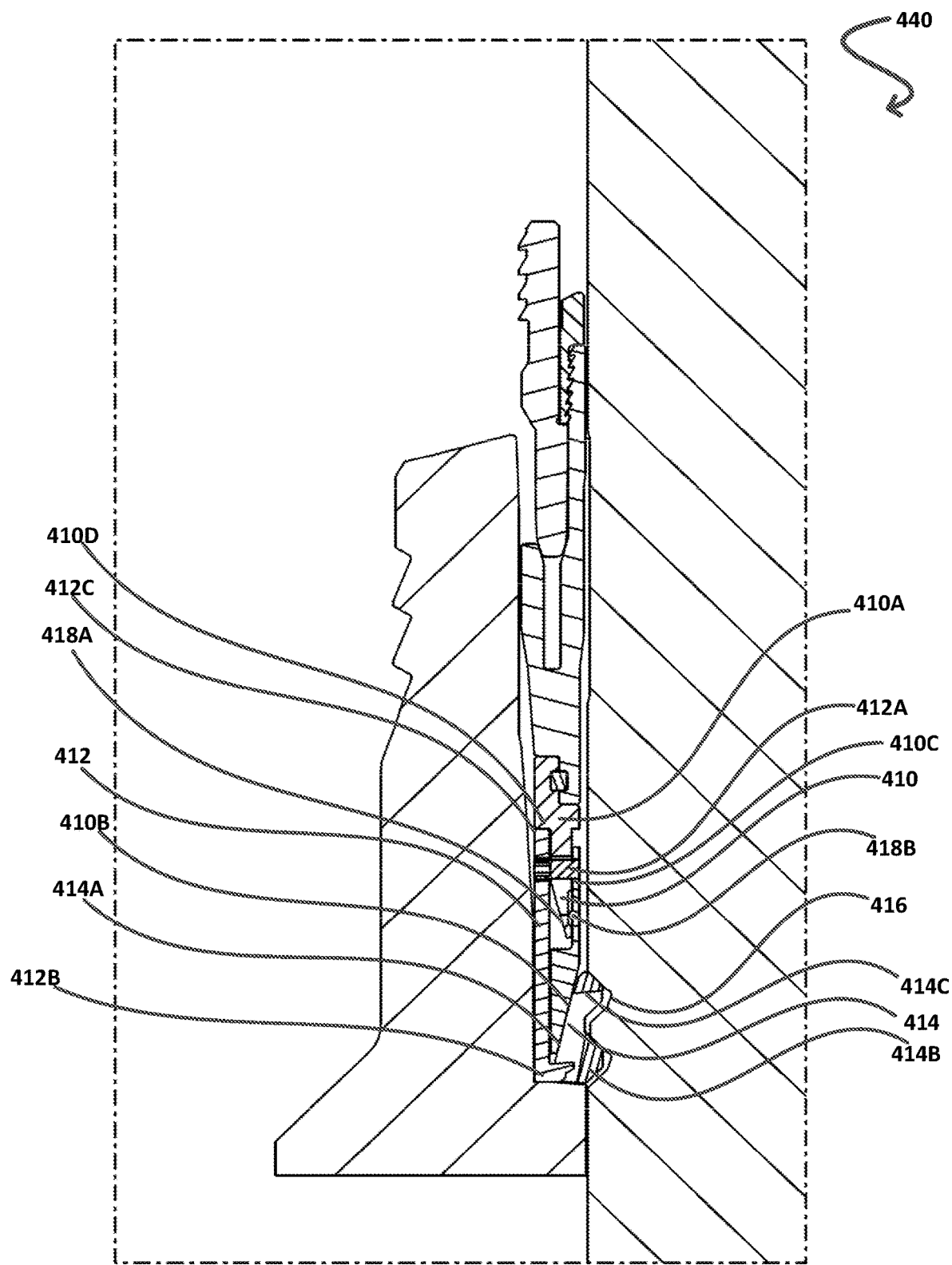
Figure 4C:
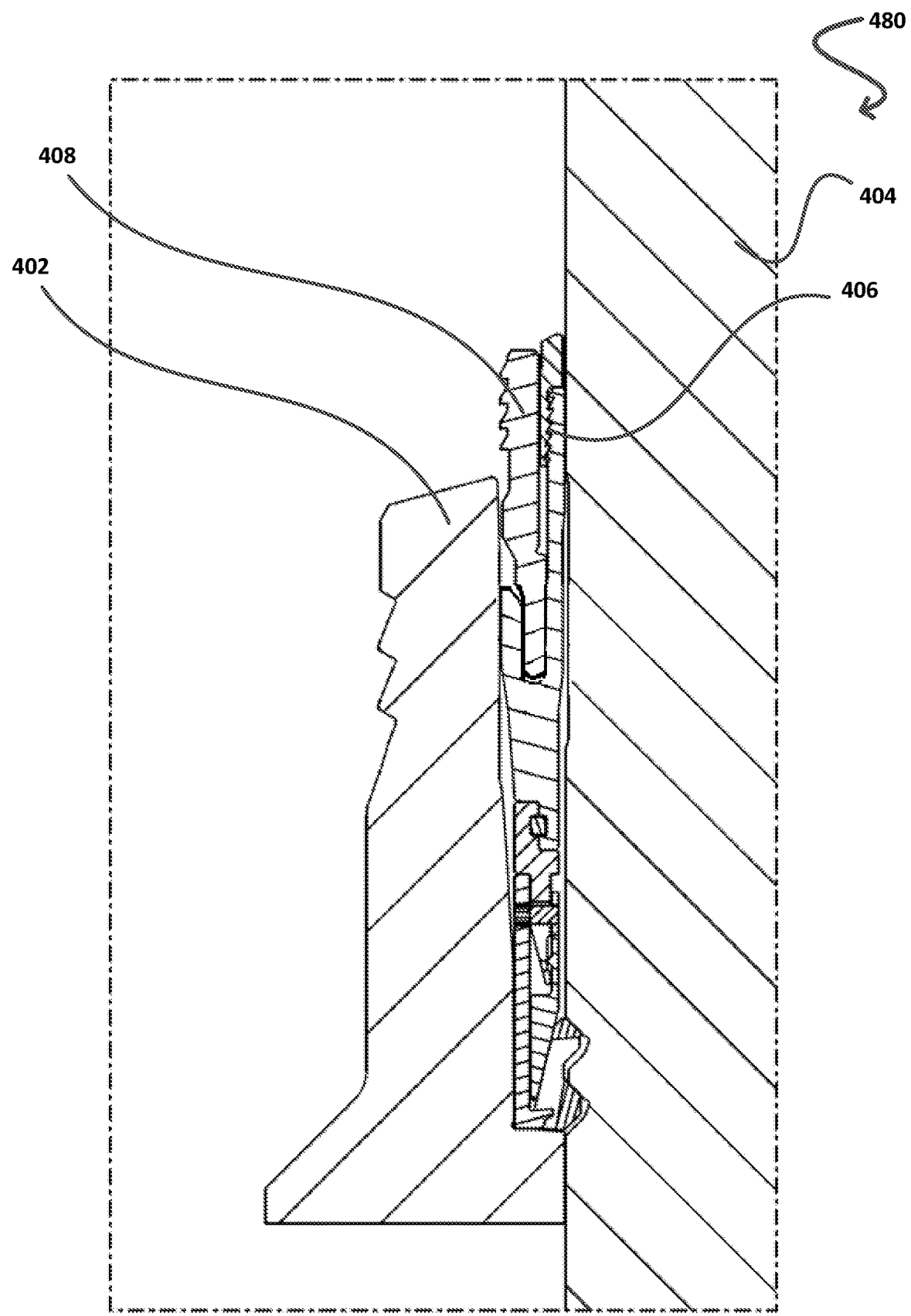

FIGS. 4A-4C illustrate an example system, in various stages 400, 440, 480, having a supporting structure 410, 414, a sealing system 406, 408, and a combination of collet and bump arrangement forming a flexible support member 418A, 418B, in accordance with an aspect of this disclosure. FIG. 4A particularly illustrates a landing stage 400 of the system, where components of the supporting structure (and may include components of the sealing system) are generally and loosely engaged together, and are lowered/landed into the area between the hanger 402 and the wellhead housing 404, as described herein. For example, the components of the supporting structure may include the actuator ring 410, the lockdown ring 414, and a support sleeve 412. In some examples, the support sleeve 412 may not be required. The actuator ring 410 includes a tapered portion 410B for engaging the lockdown ring 414 and integrally and/or separately includes the flexible support member 418A, 418B for disrupting, e.g., by collapsing or compressing, during energizing of the sealing system. For example, the actuator ring has a rigid upper portion with an associated collet 418A and the tapered portion 410B with an associated bump 418B to engage the collet 418A. The collet and bump arrangement 418A, 418B is illustrated as integral parts of the actuator ring 410. The collet and bump arrangement 418A, 418B may be designed with sufficient rigidity of the collet and sufficient protrusion of the bump to resist unzipping of the arrangement (or collapsing, or compression of at least the bump 418B). The rigidity of the collet and protrusion of the bump may be based in part on the predetermined parameters intended for the sealing system.

In application, the actuator ring 410 is engaged with the flexible support member 418A, 418B and with at least one portion 414C, illustrated as an angled ledge, of the lockdown ring 314 to enable landing of the supporting structure for the sealing system in this example, as in the case of FIGS. 2A-2C and 3A-3C. Furthermore, aspects of the example of FIGS. 2A-2C and 3A-C may be incorporated into the example of FIGS. 4A-4C, as will be readily understood by a person of ordinary skill reading the present disclosure. A support sleeve 412 may be provided as part of the supporting structure with a first lifting shoulder or attachment pin 412A for carrying weight of the support sleeve during installation and removal. The support sleeve 412 has a second lifting shoulder 412B for the angled ledge 414C of the lockdown ring 414 and a support shoulder 412C on top of the support sleeve 412 (to mate shoulder 410D of the actuator ring 410 for correctly positioning the sealing system after the locking stage). The combination of the actuator ring 410, the support sleeve 412 with its first shoulder or attachment pin 412A in notch 410C and with its second shoulder 412B in the angled ledge 414C of the lockdown ring 414, and the lockdown ring 414 may be lowered together into the area between hanger 402 and wellhead housing 404. Intermediate structures, such as a slick bore, may be omitted for focus of the illustrations, but may be included in application.

Once landed in the area, a load, as will be readily understood to a person of ordinary skill reading the present disclosure, may be applied to the actuator ring 410. For example, U-cup 406 and E-ring 408 may be included in the area as loosely engaged with a rigid portion 410A of the actuator ring 410. The rigid portion 410A of the actuator ring 410 includes two shoulders 410E, 410F for receiving the U-cup 406, as illustrated. The load to the actuator ring 410 may be via the U-cup 406, for instance. The load to the actuator ring 410 transfers to the flexible support member 418A, 418B to enable a tapered portion 410B of the actuator ring 410 to engage at least one portion 414A of the lockdown ring 414 until the actuator ring 410 is locked in an intended position within the area, and a tapered interface is formed. This is illustrated in subsequent figures (e.g., FIGS. 4B, 4C). In addition, a space 420 exists as illustrated by the features of the supporting structure and the sealing system. The space is illustrated in this example as between the support shoulder 412C of the support sleeve 412 and the shoulder 410D of the actuator ring. The space 420 is maintained during the landing stage and after the locking stage, and is maintained until loading commences for the sealing system to energize the sealing system. The space 420 ensures that the flexible support member 418 is not disrupted until the loading or energizing stages for the sealing system commences. As such, the space allows the U-cup 406 of the sealing system to descend and rest on to the supporting structure. Once space 420 is closed, loading on the E-ring 408 energizes the sealing system while it rests on the supporting structure.

FIG. 4B illustrates an example system 440 just after the locking stage, in accordance with an aspect of this disclosure. In addition, FIG. 4B illustrates that space 420 provided for the supporting structure (in FIG. 4A) has closed as the locking stage has been completed and the loading and/or energizing stages have begun. As such, now that the space 420 has closed, the U-cup 406 of the sealing system is resting on surfaces formed from support shoulders in the supporting structure. The E-ring 408 continues to load the sealing system while the sealing system rests on the supporting structure. In the system of FIGS. 4A-4C, a trigger point or condition for the collet and bump arrangement is until it unzips to close the spacing 420. The unzipping refers to when deflections of mating parts of the collet and bump arrangement cause their load flanks to lose contact, and they slide past each other. Thus, the collet and bump arrangement acts like a regular spring with a mostly-linear spring rate until it unzips, and after that point, it offers no resistance and the sealing system rests on the supporting structure with axial loads being decoupled from the sealing system.

FIG. 4B also illustrates that the energizing stage for the sealing system has started causing the collet 418A to compress or collapse the bump 418B and to slide over it, as illustrated. In FIG. 4B, components previously referred to from FIG. 4A are also illustrated and having the same function and identifiers as in FIG. 4A. As such, omitted numeral references may be carried over from FIG. 4A to FIG. 4B. In FIG. 4B, the U-cup 408 is illustrated in a lower position that may be caused by a load on the U-cup 408 from above. The load transferred to or directly applied to the actuator ring 410 causes the tapered portion of the actuator ring 410B to engage a corresponding tapered portion 414A of the lockdown ring 414. Subsequently, during energizing of the sealing system, the collet-and-bump structure 418A, 418B may have different flexibility and bump properties to resist initial energizing loads asserted for the collet 418A to overcome the bump 418B until the intended flexibility is achieved or the bump begins to depress, collapse, or compress, and until the collet slides over the bump as illustrated in FIG. 4B. This process makes it possible to set an intended position of the supporting structure and then to energize the sealing system using at least a single continuous load applied to one or more of a top or a bottom of the U-cup 406.

In an example, the support sleeve 412 is forced down with the actuator ring 410 and also tags the hanger providing rigid support for the actuator ring 410 and the lockdown ring 414. The actuator ring 410, therefore, has a first portion 410B that is a tapered portion for engaging a corresponding tapered portion 414A of the lockdown ring 414 to form a tapered interface. Once the tapered portion 414A of the lockdown ring 414 is engaged so that it is locked with the actuator ring 410, a further load may be applied to the actuator ring 410 as part of the loading and/or energizing stages for the sealing system. As the actuator ring 410 is loaded, the bump 418B is collapsed or compressed and the collet 418A slides over the bump 418B (i.e., the bump 418B resists collapsing or compression until a degree and is unable to collapse or compress further without snapping over the bump). FIG. 4B also illustrates, just after locking, that protrusions 414B of the lockdown ring 414 may engage indentations 416 of the wellhead housing or any intermediate structure therebetween. This furthers rigidity in the supporting structure and locks the lockdown ring 414 in place with the actuator ring 410 and the support sleeve 412.

FIG. 4C illustrates the energized sealing system 406, 408, above the supporting structure 410, 412, 414 provided by the locked configuration of the lockdown ring 414, the actuator ring 410, and the support sleeve 412. The supporting structure, as illustrated, in its locked position, decouples axial loads resulting from reactive forces, such as wedge reactive forces from the tapered interface, on the actuator ring and on commencing loading and/or energizing of the sealing system. The pressuring of the supporting structure 410, 412, 414, and the energizing of the sealing system 406, 408 may be enabled by a single continuous force from a load applied beginning at the U-cup 406 and then the E-ring 408. The supporting structure 410, 412, 414, and the sealing system 406, 408 may, therefore, be set in one continuous action. The rigid loading path in the system of FIGS. 4A-4C comprises at least the support shoulder 412C of the support sleeve 412 that receives resting shoulder 410D of the actuator ring and the support shoulder 410E of the actuator ring 410 that receives the U-cup 406. The compliant loading path in the system of FIGS. 4A-4C comprises at least the flexible support member via collet and bump arrangement 418A, 418B.

FIGS. 5A-5D illustrate an example system, in various stages 500, 540, 580, 590, having a supporting structure 514, a sealing system 506, 508, and a dual bias washer or Belleville washer flexible support member 518, in accordance with an aspect of this disclosure. In this example, a support sleeve is not used. The lockdown ring 514 is lowered into area between the hanger 502 and the wellhead housing 504. The actuator ring 510 includes the flexible support member 518 integrally or separately. The actuator ring 510 includes a lower tapered edge 510B and a support structure 510A for the flexible support member 518. The lockdown ring 514 includes one or more of protrusion 514B for locking with one or more of indentation 516 of the wellhead housing or any intermediate component such as a slick bore. A further supporting notch and protrusion is provided in feature 514C of the lockdown ring on an opposite side of protrusion 514B. Feature 514C may be spaced with an indentation on the hanger 502. A shoulder 514D is also provided on the lockdown ring 514 to provide structural support to the sealing system 506, 508 during an energizing stage of the example system.

Figure 5A:
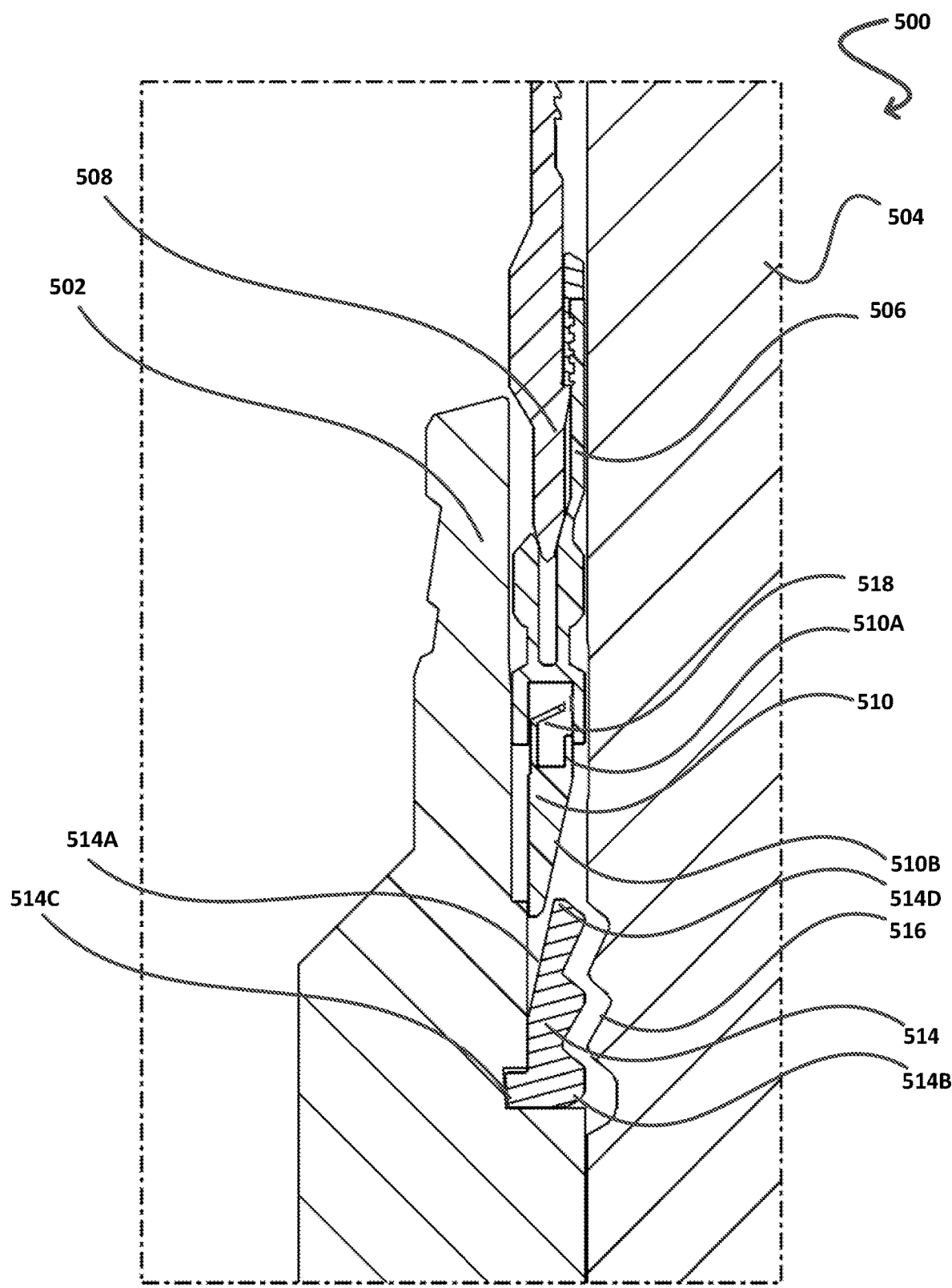
FIGS. 5A-5D illustrate a further example system, in various stages, having a supporting structure, a sealing system, and a dual bias washer or Belleville washer forming a flexible support member, in accordance with an aspect of this disclosure.
Figure 5B:
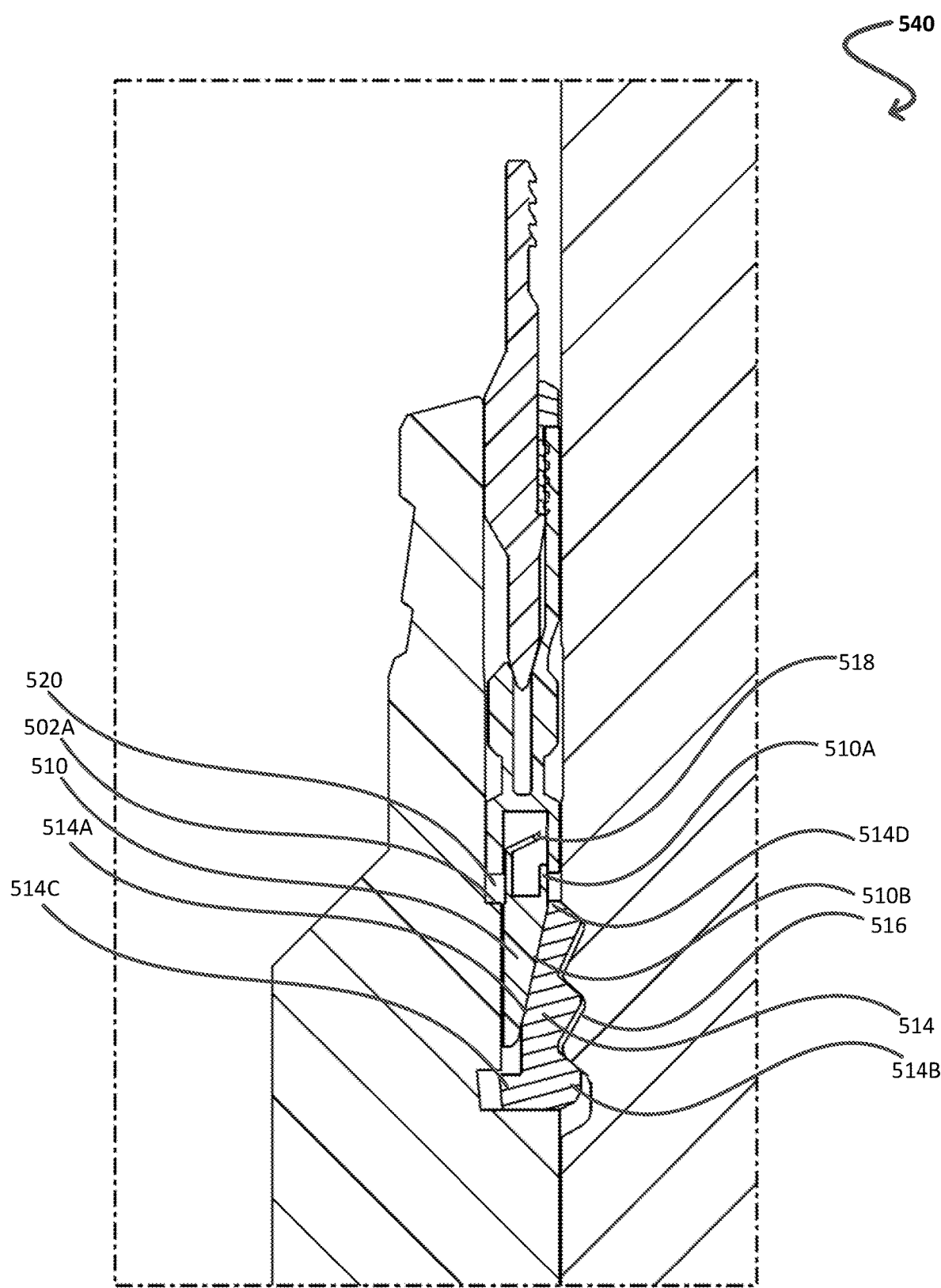

FIG. 5A illustrates the components 510, 514 are associated together loosely during a landing stage 500 for the components 510, 514, in an area between the hanger and the wellhead housing. Furthermore, a U-cup 506 and an E-ring 508 may be concurrently or subsequently landed in the area. FIG. 5B illustrates the example system, during the locking stage 540, where load is asserted, perhaps via U-cup 506 to move the actuator ring 510 into the locking position with the lockdown ring 514. At this stage, the one or more protrusions 514B lock the one or more indentations 516. Protrusion 514C moves out from the indentation in the hanger to provide a shoulder to limit the movement of the tapered edge 510B of the actuator ring into the area. In addition, in FIG. 5B, a space 520 exists as illustrated by the features of the supporting structure and the sealing system. The space 520 is illustrated in this example as between a support shoulder 502A of the hanger 502 and the shoulder 514D of the lockdown ring 514. The space 520 is maintained during the landing stage 500 and after the locking stage 540, and is maintained until loading commences for the sealing system to energize the sealing system as illustrates by the space 520 closed in stages 580, 590. The space 520 ensures that the flexible support member 518 is not disrupted until the loading or energizing stages for the sealing system commences. As such, the space 520 allows the U-cup 506 of the sealing system to the supporting structure and rest on to the supporting structure. Once the space 520 is closed, loading on the E-ring 508 energizes the sealing system while it rests on the supporting structure.

Figure 5C:
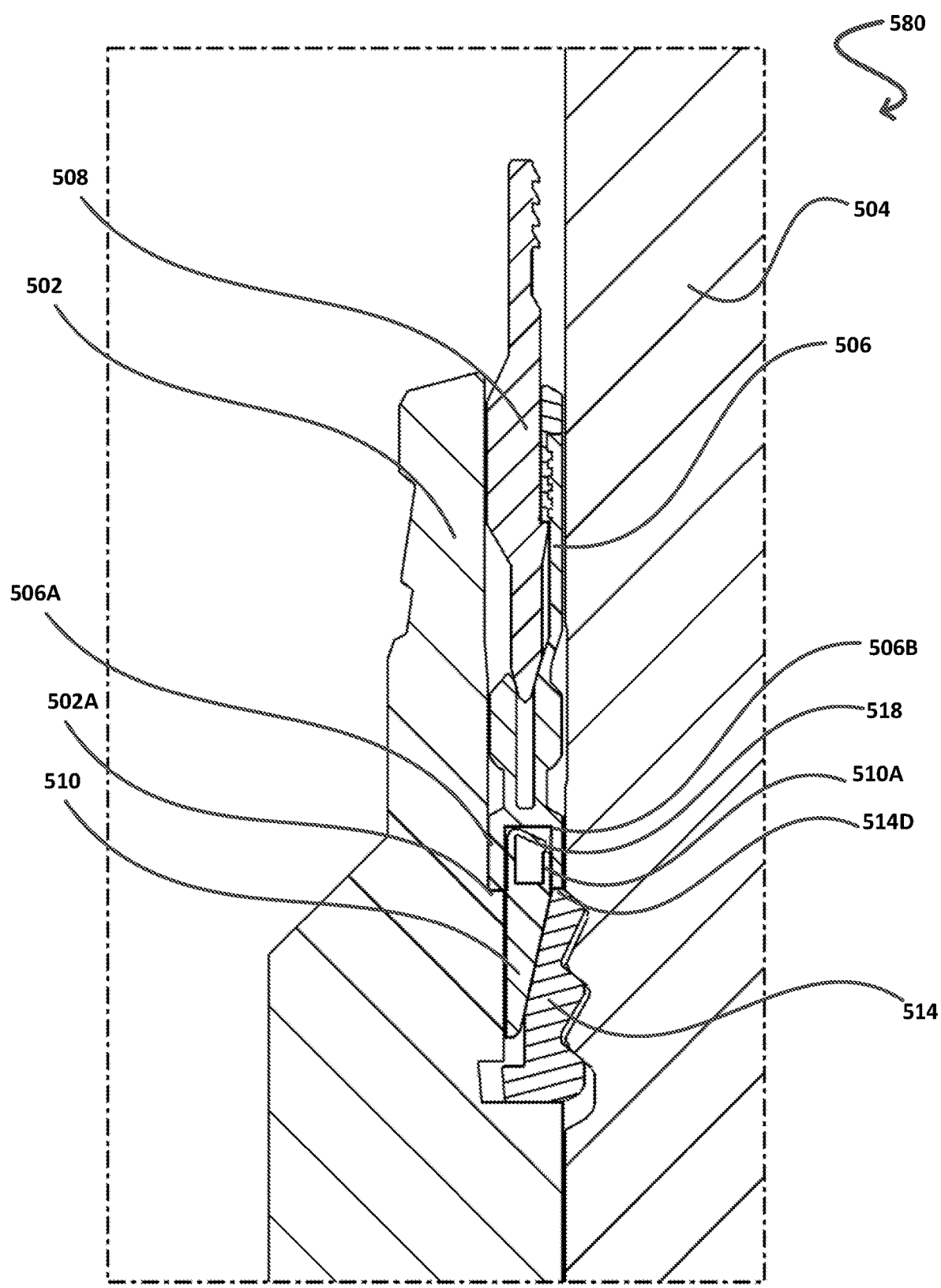

FIG. 5C illustrates system 580 just after the locking stage has completed and the energizing stage has started, where the flexible support member 518 (i.e., the dual bias washer) is flexed inside-out (e.g., like flipping of a Belleville washer), which is achieved when certain maximum intended load is asserted on the actuator ring. In addition, FIG. 5C illustrates that space 520 previously provided for the supporting structure (in FIG. 5B) has closed as the locking stage has been completed and the loading and/or energizing stages 580 has progressed (stage 590 illustrates completion of the loading and/or energizing stages). As such, now that the space 520 has closed, the U-cup 506 of the sealing system is resting on surfaces formed from support shoulders in the supporting structure. The E-ring 508 continues to energize the sealing system while the sealing system rests on the supporting structure. In the system of FIGS. 5A-5D, a trigger point or condition for the washer is when a conical segment of the washer stops acting as a spring (e.g., like a Bellville washer) to close the spacing. The conical segment maintains this feature until it deflects so far that it turns inside out. Such a feature is like a dual-bias spring because the strain energy stored in the spring is less at either extreme ends of travel than at the middle. The spring will spontaneously flip its spring rate once the trigger point is passed and the sealing system rests on the supporting structure with axial loads being decoupled from the sealing system.

Figure 5D:
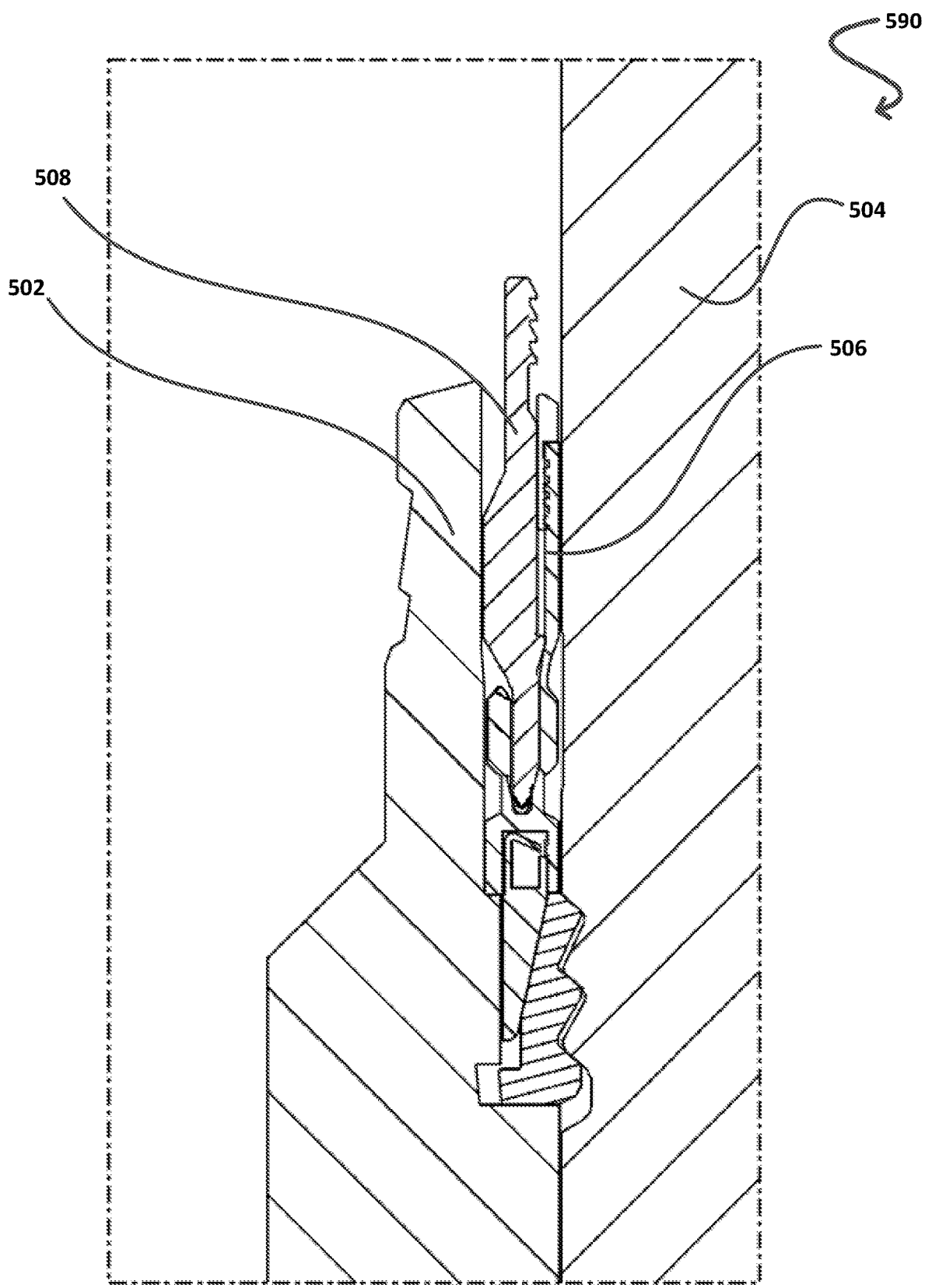

As in the case of the prior examples, the flexible support member 518 may partly resist the load asserted until it begins to disrupt, such as to depress, compress, rupture, or flex in the manner shown in FIG. 5C (i.e., flipping inside-out) during loading and/or energizing of the sealing system above the supporting structure. Also illustrated in FIG. 5C is that the U-cup 506 rests legs 506A, 506B against a shoulder 502A in hanger (or any intermediate feature of the hanger, including an optional support sleeve) and against shoulder 514D of the lockdown ring 514. FIG. 5D illustrates system in a stage 590 where the energizing of the sealing system 506, 508 is complete. The energizing of the sealing system 506, 508 is by the E-ring 508, which enters the U-cup 506 with the U-cup in an intended placement resting above the supporting structure 510, 514. In FIG. 5D, the U-cup is resting on the supporting structure with legs 506A, 506B on shoulder 514D of the lockdown ring 514 and shoulder 502A of the hanger 502. As in the case of the prior examples, the reference numerals from FIGS. 5A-5D are interchangeable and used across FIGS. 5A-5D because these figures show a system in various stages. Further, aspects from the examples of FIGS. 2A-2C, 3A-4C, and 4A-4C may be incorporated into the example of FIGS. 5A-5D, as will be readily understood by a person of ordinary skill reading the present disclosure. Explanations of the predetermined parameters are also applicable here from prior examples, as will be readily understood by a person of ordinary skill reading the present disclosure. The rigid loading path in the system of FIGS. 5A-5D comprises at least the support shoulder 502A of the hanger 502 that receives a leg 506A of the U-cup and the support shoulder 514D of the lockdown ring 514 that receives a second leg 506B of the U-cup 506. The compliant loading path in the system of FIGS. 5A-5D comprises at least the flexible support member 518.

Figure 6:
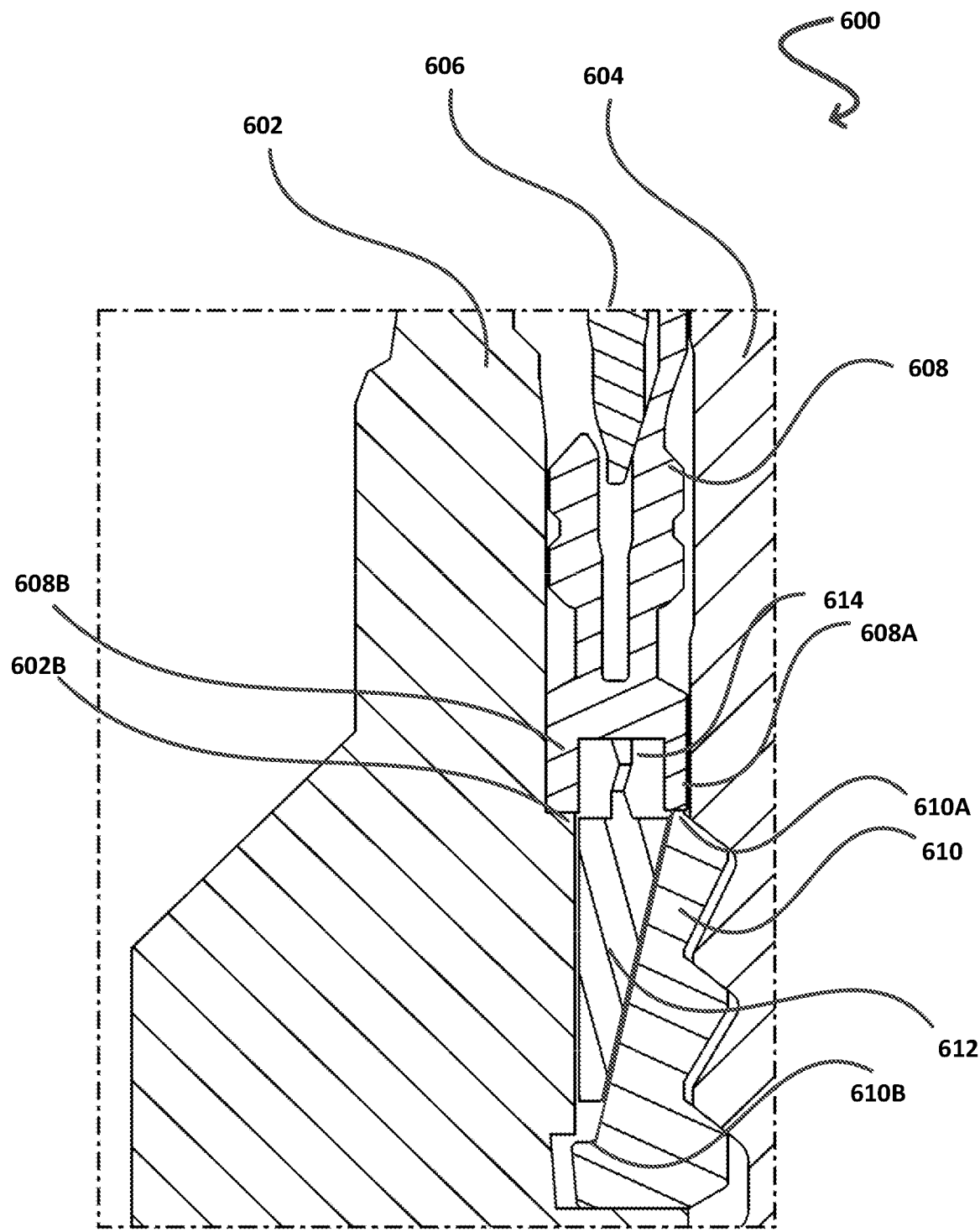
FIG. 6 illustrates a closer view of an example system having a flexible support member that has collapsed, spacing that is closed, and a sealing system that is resting on a supporting structure that is in a mechanically locked position, in accordance with aspects of this disclosure.

FIG. 6 illustrates a closer view of an example system 600 having a flexible support member 614 that has collapsed, spacing that is closed, and a sealing system 606, 608 that is resting on shoulders of a supporting structure 602, 612, 610 that is in a mechanically locked position, in accordance with aspects of this disclosure. Unlike examples in FIGS. 2A-2C, 3A-4C, and 4A-4C, example 600 does not use a support sleeve, which is like the aspects in FIGS. 5A-5D. However, a different flexible support member 614 is used than the dual bias washer 518 of the stages of system 500, 540, 580, and 590 in FIGS. 5A-5D. The flexible support member 614 may be one or more members that are able to be disrupted, e.g., collapsible or compressible together, and may be integral or separate from the actuator ring 612. In this case, as in the system of FIGS. 5A-5D, the lockdown ring 610 includes shoulder 610A for leg 608A of the U-cup 608, while hanger 602 or an intermediate component includes a shoulder 602B for leg 608B of the U-cup 608. The flexible support member 614 is illustrated as collapsing or compressing under the asserted load of the energizing stage. The E-ring 606 is not yet fully energized into the U-cup 608. A shoulder 610B may be provided for the lockdown ring 610 to shoulder a portion of the tapered edge of the actuator ring 612 if needed. The rigid loading path in the systems of FIG. 6 comprises at least the support shoulder 602B of the hanger 602 that receives a leg 608B of the U-cup and the support shoulder 610A of the lockdown ring 610 that receives a second leg 608A of the U-cup 608. The compliant loading path in the system of FIGS. 5A-5D comprises at least the flexible support member 614.

Figure 7A:
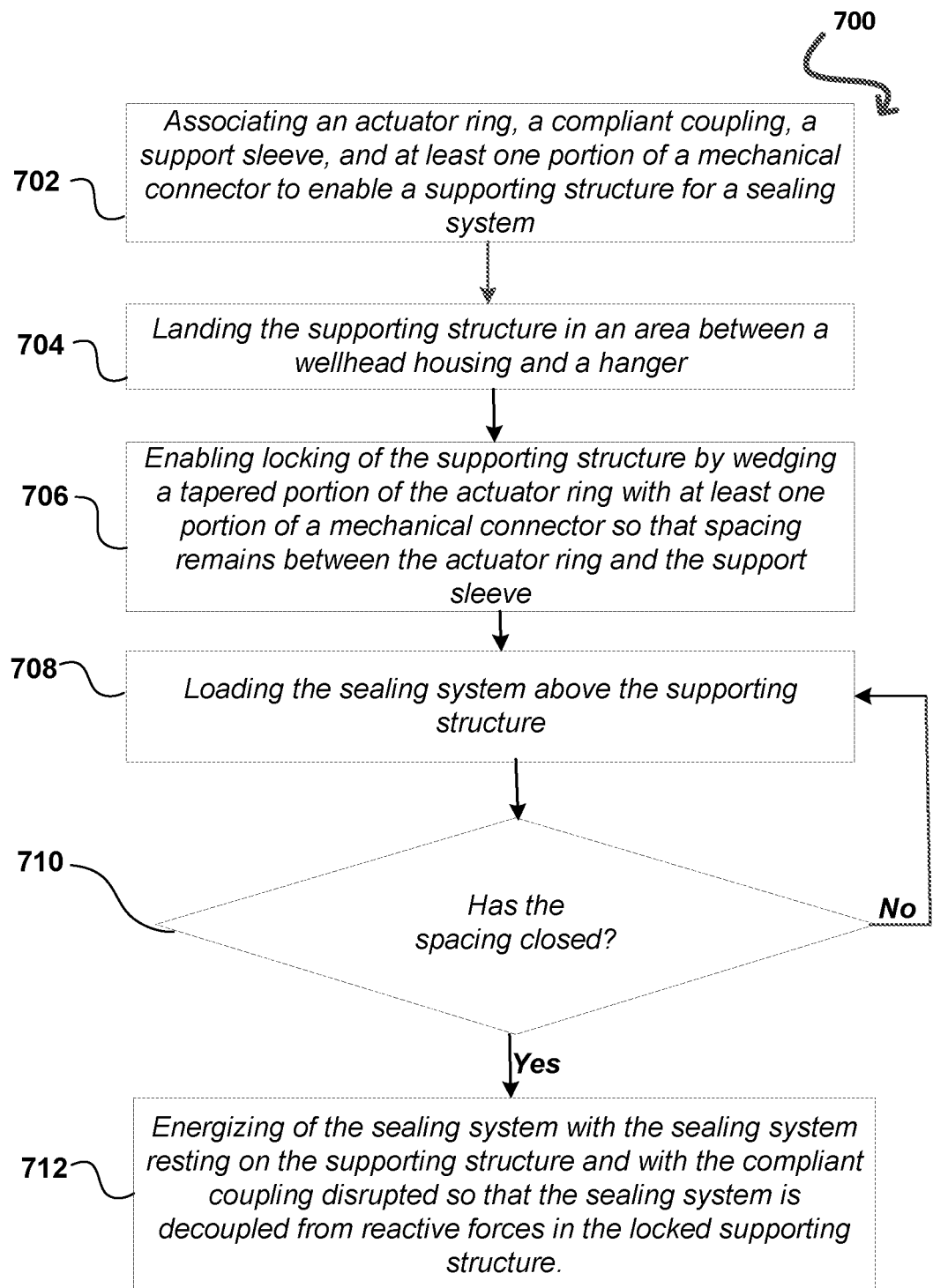
FIG. 7A illustrates a process flow for decoupling a sealing system from wedge reactive forces caused by at least a tapered interface in the supporting structure, in accordance with aspects of this disclosure.

FIG. 7A illustrates a process flow 700 for decoupling a sealing system from wedge reactive forces caused by a tapered interface in the supporting structure, in accordance with aspects of this disclosure. The method includes a sub-process 702 for associating or loosely engaging an actuator ring, a flexible support member, a support sleeve, and at least one portion of a lockdown ring to enable a supporting structure for the sealing system. This represents placement of the various components together either concurrently or subsequently. For example, the association in sub-process 702 may broadly encompass external physical verification that a lockdown ring can properly engage with the actuator ring, even if they are not physically engaged together after the sub-process 702. The verification is sufficiently part of the sub-process 702 for associating components that enable the supporting structure and the sealing system. In another example, the actuator ring with its integral or separate flexible support member may be engaged with the lockdown ring to ensure fit and positioning as a full sub-process 702 or as part of sub-process 702. Sub-process 704 is a landing stage for the supporting structure, in which the supporting structure is landed in an area between a wellhead housing and a hanger. For example, if the actuator ring and the lockdown ring are required to be physically engaged together and lowered/landed into the area, the physical engagement is performed in sub-process 702 and the lowering/landing is performed in sub-process 704. When a physical engagement is not required, a fit of the components, including verifying that the components are intended to work together, is performed in sub-process 702. Sub-processes 702, 704 also encompass, when the physical engagement is not require, each of the components verified as associated together in sub-process 702, and lowered/landed separately, with adjustments available in between so that the supporting structure is ready for locking by sub-process 704.

In sub-process 706, locking is enabled for the supporting structure. A load is applied directly or indirectly to the actuator ring to enable locking of a tapered portion of the actuator ring with the at least one portion of the lockdown ring by a wedging of a tapered portion of the actuator ring with at least a portion of the lockdown ring to form a tapered interface. The support sleeve may be tagged against the hanger and a flat surface, opposite to the tapered portion, of the actuator ring. This is done in a manner ensuring that spacing remains between the actuator ring and the support sleeve until loading commences for the sealing system. In sub-process 708, loading of the sealing system commences above the supporting structure. Sub-process 708 enables the sealing system to move from a de-energized position to an energized position, during which the spacing closes. Particularly, load may be asserted on the U-cup or the E-ring (or both) as illustrated in detail with respect to the previous system examples.

Sub-process 710 determines that the spacing has closed as the sealing system moves to the energized position, which implies that the sealing system is resting on the supporting structure and that the flexible support member has disrupted. On positive determination, sub-process 712 energizes the sealing system with the sealing system resting on the supporting structure. The disruption of the flexible support member enables decoupling of the sealing system from reactive forces in the locked supporting structure, such as in the tapered interface. When the determination is negative, sub-process 708 continues loading the sealing system until the spacing has closed. In an example, the loading in sub-process 708 does not cause the E-ring to penetrate the U-cup. As previously noted, the U-cup has a tapered mouth to resist the E-ring initially. In sub-process 712, after the spacing has closed, the tapered mouth is compromised and the E-ring enters the U-cup to energize the sealing system. In an example, loading in sub-process 708 continues through a load asserted on the E-ring so that the spacing is closed, the sealing system rests on the supporting structure, the flexible support member is disrupted, and energizing of the U-cup occurs, all in a single continuous action. As such, loading of the sealing system continues until the sealing system is energized, in an instance.

Figure 7B:
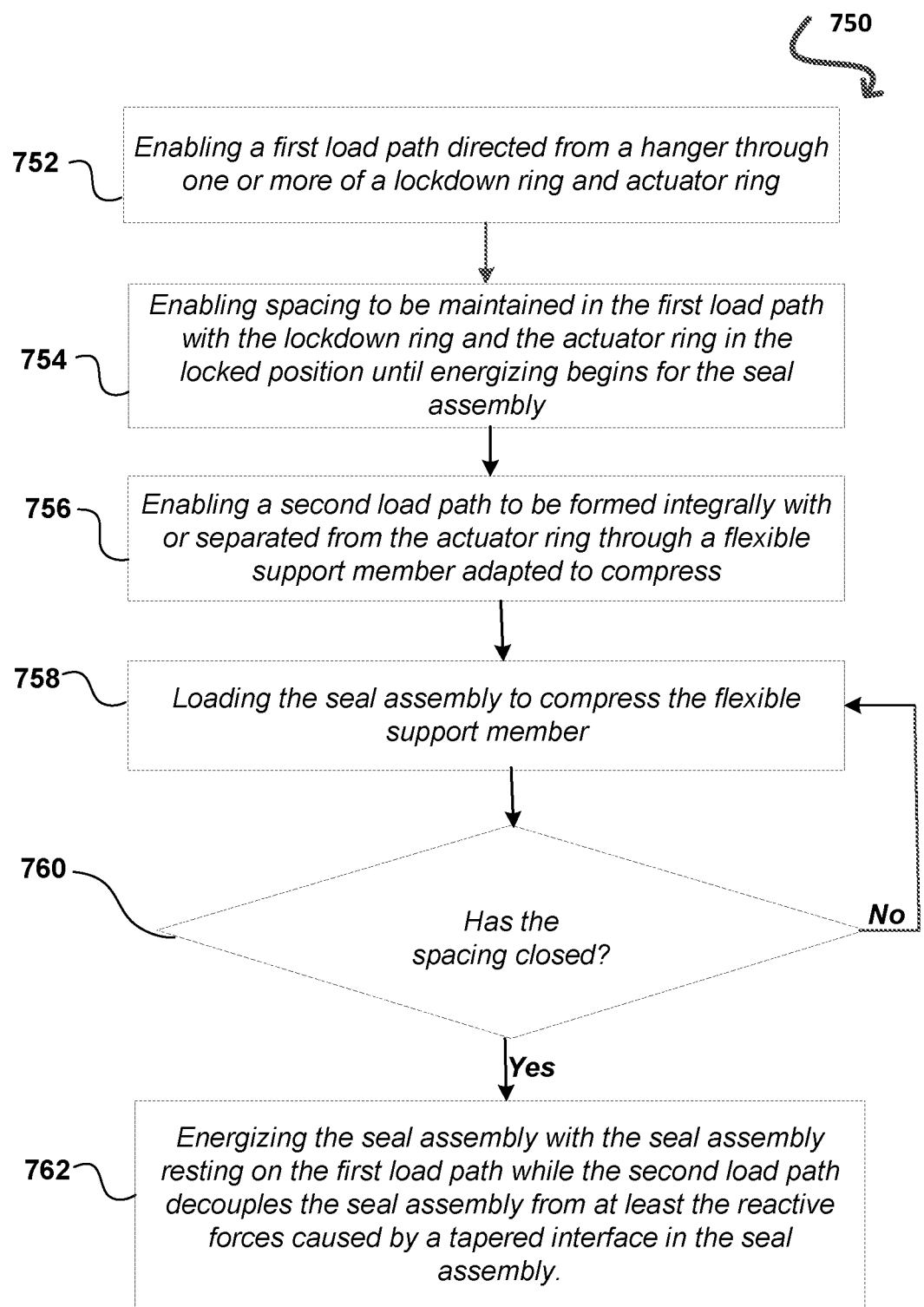
FIG. 7B illustrates a process flow for decoupling a seal assembly from forces intended for the seal assembly using load paths, in accordance with aspects of this disclosure.

FIG. 7B illustrates a method 750 for decoupling a seal assembly from forces intended for the seal assembly using load paths. The method 750 includes enabling 752 a first load path directed through one or more of a lockdown ring and an actuator ring in a locked position. The first load path may additionally include a hanger and a support sleeve. The method includes enabling 754 spacing to be maintained between the seal assembly and the supporting structure, after the two or more components are in the locked position and until energizing begins for the seal assembly. The energizing for the seal assembly may feature a loading step prior to an energizing step for the seal assembly or concurrent with the energizing step for the seal assembly. As such, unless stated otherwise, the reference to energizing for the seal assembly will be readily understood by a person of ordinary skill to commence with the loading and progress with energizing of the seal assembly. The U-cup may not be penetrated by the E-ring during loading, but is penetrated by the E-ring during the energizing of the seal assembly. As such, the seal assembly is in a de-energized position when the U-cup is not penetrated till after the energizing is completed. Further, the loading step may be referenced relative to the energizing step to indicate that the effect of the loading step is, first, to lock the supporting structure, which may be distinct, but may also overlap the start of an energizing step to energize the seal assembly. Sub-process 756 enables a second load path to be formed integrally with or separately from the actuator ring through at least a flexible support member that is adapted to compress during at least the loading step. Sub-process 758 loads the seal assembly or commences loading of the supporting structure after locking of the supporting structure. As in the case of process 700, sub-process 758 causes a load to be asserted on the E-ring or the U-cup.

Sub-process 760 ensures that the spacing of sub-process 754 has closed, which means that the seal assembly is resting on the first load path and that the flexible support member has been disrupted. As loading in sub-process 758 may occur through the seal assembly (e.g., load applied to the E-ring or the U-cup), sub-process verifies movement of the seal assembly from de-energized to energized positions. The movement first enables the seal assembly to rest on at least two shoulders of in first load path after the spacing is closed and enables the flexible support member to disrupt. Sub-process 762 energizes the seal assembly as it rests on the first load path to ensure that the seal assembly reaches the energized position. The disruption of the flexible support member enables decoupling of the sealing system from wedge reactive forces caused by a tapered interface between the two or more components in the mechanically locked position. When energizing of the seal assembly overlaps a loading of the seal assembly, sub-process 758 can be ensured to continue until the spacing has closed, until the seal assembly is resting on the supporting structure, and until the flexible support member is disrupted, before energizing begins in the seal assembly. As in the case of example 700, the loading in sub-process 758 does not cause the E-ring to penetrate the U-cup. In sub-process 762, after the spacing has closed, the U-cup entry is compromised and the E-ring enters the U-cup. In an example, loading in sub-process 758 continues through a load asserted on the E-ring so that the spacing is closed, the seal assembly rests on the supporting structure, the flexible support member is disrupted, and energizing of the U-cup occurs, all in a single continuous action. As such, sub-processes 758-762 may be part of a singular action of commencing the energizing for the sealing system. As such, loading of the seal assembly continues until the seal assembly is energized, in an instance. In addition, a load, distinct from sub-process 758, may be asserted before the supporting structure is locked in position to cause the supporting structure to lock and to cause sub-processes 758-762 to occur, in a single continuous action.

The specification and drawings are, accordingly, to be regarded in an illustrative rather than a restrictive sense. It will, however, be evident that various modifications and changes may be made thereunto without departing from the broader spirit and scope of the invention as set forth in the claims. Further, any of the many embodiments disclosed here may be combined by a person of ordinary skill using the present disclosure to understand the effects of such combinations.

What is claimed is:

1. An annular seal system for sealing between a casing hanger and a wellhead housing, comprising:

an actuator ring comprising a rigid portion and a flexible portion;

a lockdown ring positioned adjacent the actuator ring; and a seal assembly capable of moving between a de-energized position and an energized position, wherein the seal assembly in the de-energized position has a space between the seal assembly and the rigid portion of the actuator ring, wherein the seal assembly in the energized position has the space closed, wherein the rigid portion of the actuator ring is to contact a surface of the casing hanger, wherein the flexible portion of the actuator ring is to push the lockdown ring into engagement with the wellhead housing, and wherein the flexible portion of the actuator ring is adapted to disrupt and to allow positional variation of the actuator ring between the lockdown ring and the wellhead housing with the seal assembly being in the energized position.

2. The annular seal system of claim 1, wherein the seal assembly comprises:

the flexible portion of the actuator ring to allow for the positional variation between positions of provided grooves in the wellhead housing and corresponding protrusions on the lockdown ring.

3. The annular seal system of claim 1, wherein the seal assembly comprises:

the flexible portion of the actuator ring to dissipate reactive forces to prevent the reactive forces from reaching the seal assembly.

4. The annular seal system of claim 1, wherein the seal assembly comprises:

a U-shaped seal; and an energizing ring configured to push the U-shaped seal into sealing contact with the casing hanger and the wellhead housing.

5. The annular seal system of claim 1, wherein at least a part of the flexible portion of the actuator ring extends between the seal assembly and the rigid portion of the actuator ring while the space between the seal assembly and the rigid portion of the actuator ring is maintained.

6. The annular seal system of claim 1, wherein the flexible portion of the actuator ring includes a flexible element selected from the group consisting of a bladder, one or more collapsible or compressible members, and a combination of a collet and bump.

7. The annular seal system of claim 1, wherein the flexible portion of the actuator ring is capable of the disruption when a load is applied to the seal assembly.

8. The annular seal system of claim 1, wherein the actuator ring further comprises a first tapered surface, and the lockdown ring comprises a second tapered surface, the first tapered surface and the second tapered surface interacting to form a tapered interface, wherein relative axial movement between the actuator ring and the lockdown ring at the tapered interface is adapted to drive the lockdown ring toward the wellhead housing.

9. The annular seal system of claim 1, wherein the rigid portion of the actuator ring includes a pin, and the flexible portion of the actuator ring defines a notch adapted to receive the pin to maintain one or more relative positions of the rigid portion and the flexible portion of the actuator ring.

10. The annular seal system of claim 1, further comprising:
protrusions on the lockdown ring to engage the wellhead housing when the seal assembly is in the energized position.

11. A method for an annular seal system for sealing between a casing hanger and a wellhead housing, the method comprising the steps of:
providing an actuator ring comprising a rigid portion and a flexible portion;
positioning a lockdown ring adjacent to the actuator ring; and
enabling a seal assembly to move between a de-energized position and an energized position, wherein the seal assembly in the de-energized position has a space between the seal assembly and the rigid portion of the actuator ring, wherein the seal assembly in the energized position has the space closed, wherein the rigid portion of the actuator ring is to contact a surface of the casing hanger, wherein the flexible portion of the actuator ring is to push the lockdown ring into engagement with the wellhead housing, and wherein the flexible portion of the actuator ring is adapted to disrupt and to allow positional variation of the actuator ring between the lockdown ring and the wellhead housing with the seal assembly being in the energized position.

12. The method of claim 11, further comprising:
allowing the flexible portion of the actuator ring to have the positional variation between positions of provided grooves in the wellhead housing and corresponding protrusions on the lockdown ring.

13. The method of claim 11, further comprising:
dissipating, using the flexible portion of the actuator ring, reactive forces to prevent the reactive forces from reaching the seal assembly.

14. The method of claim 11, further comprising:
providing a U-shaped seal; and
pushing, using an energizing ring, the U-shaped seal into sealing contact with the casing hanger and the wellhead housing.

15. The method of claim 11, wherein at least a part of the flexible portion of the actuator ring extends between the seal assembly and the rigid portion of the actuator ring while the space between the seal assembly and the rigid portion of the actuator ring is maintained.

16. The method of claim 11, wherein the flexible portion of the actuator ring includes a flexible element selected from the group consisting of a bladder, one or more collapsible or compressible members, and a combination of a collet and bump.

17. The method of claim 11, wherein the flexible portion of the actuator ring is capable of the disruption when a load is applied to the seal assembly.

18. The method of claim 11, wherein the actuator ring further comprises a first tapered surface, and the lockdown ring comprises a second tapered surface, the first tapered surface and the second tapered surface interacting to form a tapered interface, wherein relative axial movement between the actuator ring and the lockdown ring at the tapered interface is adapted to drive the lockdown ring toward the wellhead housing.

19. The method of claim 11, wherein the rigid portion of the actuator ring includes a pin, and the flexible portion of the actuator ring defines a notch adapted to receive the pin to maintain one or more relative positions of the rigid portion and the flexible portion of the actuator ring.

20. The method of claim 11, further comprising:
engaging, using protrusions on the lockdown ring, the wellhead housing when the seal assembly is in the energized position.

* * * * *